United States Patent
Moriai et al.

(10) Patent No.: US 7,228,115 B2
(45) Date of Patent: Jun. 5, 2007

(54) RECEIVING METHOD AND RECEIVER WITH HIGH-PRECISION SIGNAL ESTIMATION

(75) Inventors: Shinsuke Moriai, Inuyama (JP); Naoaki Nishimura, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 332 days.

(21) Appl. No.: 10/919,339

(22) Filed: Aug. 17, 2004

(65) Prior Publication Data
US 2005/0070237 A1 Mar. 31, 2005

(30) Foreign Application Priority Data
Sep. 29, 2003 (JP) ............................ 2003-337765
Feb. 10, 2004 (JP) ............................ 2004-033607

(51) Int. Cl.
*G06F 3/033* (2006.01)
*H04B 17/02* (2006.01)
*H04B 17/00* (2006.01)

(52) U.S. Cl. ................... 455/130; 455/139; 455/67.16

(58) Field of Classification Search ............... 455/130, 455/184.1, 185.1, 67.13, 67.16, 139, 205, 455/151.1; 375/147–148, 144, 130, 344, 375/285, 340
See application file for complete search history.

(56) References Cited

U.S. PATENT DOCUMENTS

| | | | |
|---|---|---|---|
| 6,347,126 B1* | 2/2002 | Nagayasu et al. | 375/344 |
| 6,647,071 B2* | 11/2003 | Sommer et al. | 375/285 |
| 6,654,432 B1* | 11/2003 | O'Shea et al. | 375/354 |
| 6,952,570 B2* | 10/2005 | Nagayasu | 455/208 |
| 7,016,404 B2* | 3/2006 | Yang | 375/229 |
| 2003/0043891 A1* | 3/2003 | Takahashi | 375/148 |
| 2004/0203460 A1* | 10/2004 | Hasegawa | 455/67.13 |
| 2005/0089115 A1* | 4/2005 | Hartmann et al. | 375/285 |
| 2006/0159188 A1* | 7/2006 | Izumi | 375/260 |

FOREIGN PATENT DOCUMENTS

JP 2003-168999 6/2003

* cited by examiner

*Primary Examiner*—Sonny Trinh
(74) *Attorney, Agent, or Firm*—McDermott Will & Emery LLP

(57) ABSTRACT

A phase rotation unit rotates the phase of a digital received signal in accordance with a correction signal from a correction determination unit. An FWT computation unit subjects a CCK modulated signal to FWT computation and outputs Walsh transform values FWT. A maximum value searching unit receives Walsh transform values FWT and selects one of them by referring to the magnitude thereof. In accordance with the selected Walsh transform value FWT, the maximum value searching unit outputs a $\phi 1$ signal and a $\phi$ component signal, the $\phi 1$ signal corresponding to the signal prior to $\phi 1$ differential detection and the $\phi$ component signal being a combination of $\phi 2$ through $\phi 4$. A $\phi 1$ demodulation unit subjects the $\phi 1$ signal to differential detection so as to generate $\phi 1$. A second phase error detection unit 56 detects a phase error in accordance with an output signal from the $\phi 1$ demodulation unit.

28 Claims, 12 Drawing Sheets

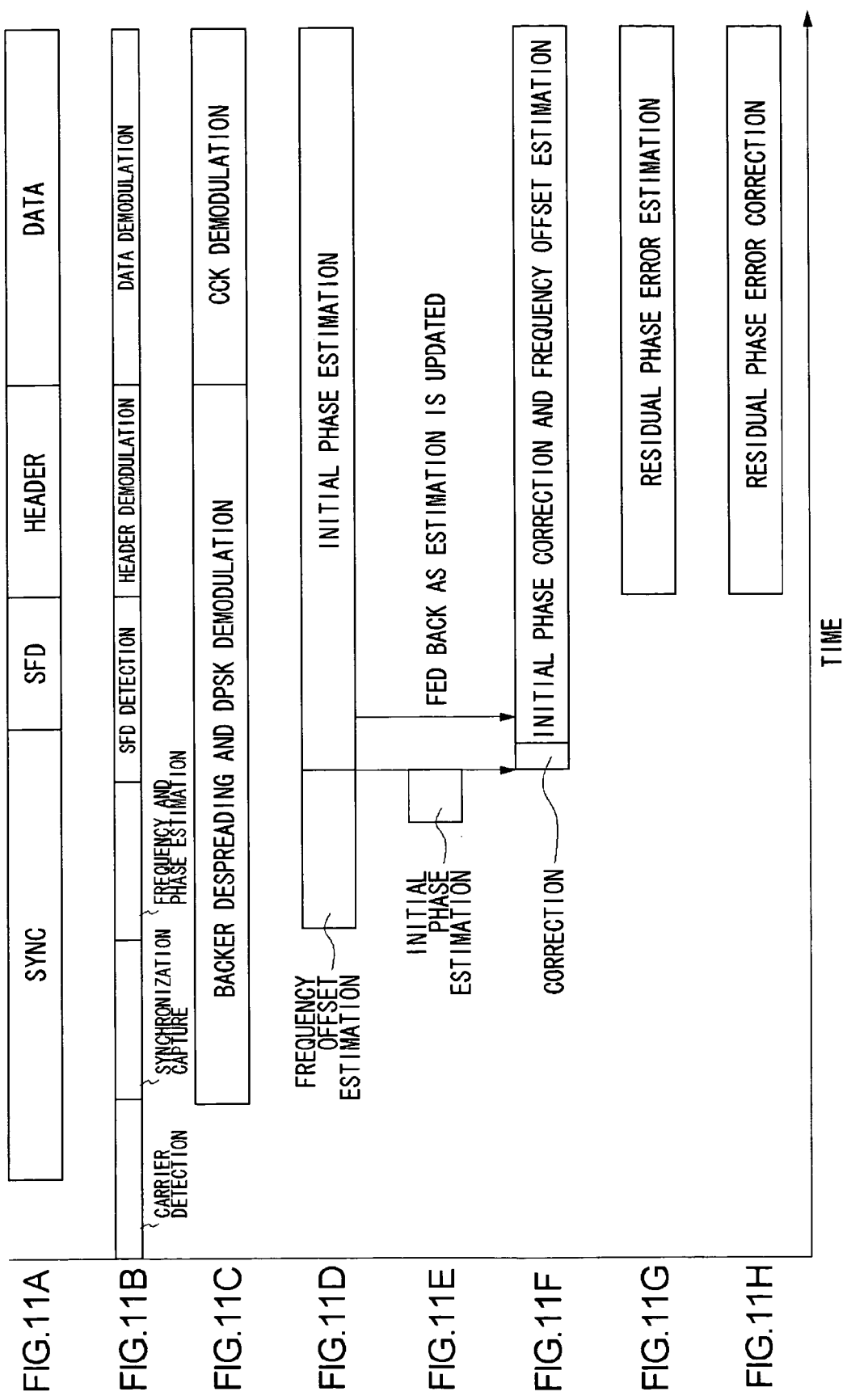

RECEIVING METHOD AND RECEIVER WITH HIGH-PRECISION SIGNAL ESTIMATION

BACKGROUND OF THE INVENTION

1. Field of the Invention

The present invention relates to a technology of signal receiving and, more particularly to a method and apparatus for receiving a spectrum spreading signal.

2. Description of the Related Art

Wireless local area network (LAN) that complies with the IEEE 802.11b standard is practiced as a spectrum spreading communications system using a radio frequency of 2.4 GHz band. The IEEE 802.11b wireless LAN enables a maximum transmission rate of 11 Mbps using complementary code keying (CCK). The Radio Law prescribes the bandwidth of wireless LAN to be 26 MHz. Therefore, the maximum chip rate in a direct sequence scheme is also 26 Mcps. Assuming that the chip rate of 26 Mcps is band-limited by an ideal Nyquist filter, the sampling frequency required of a D/A converter is 40 MHz. Also, strict band limitation after the D/A conversion is necessary. Therefore, band limitation using a Nyquist filter is not practical. Instead of using a Nyquist filter for band limitation, analog filtering subsequent to the D/A conversion is used for band limitation, resulting in a maximum chip rate of 11 Mbps. In a receiver adapted for CCK modulation, a plurality of waveform patterns for a transmitted signal are generally prepared. A signal having a waveform that best matches the waveform of the received signal is defined as a demodulation result (for example, see a Relate Art List No. 1).

Related Art List
(1) Japanese Patent Application Laid-Open No. 2003-168999.

In demodulating a CCK modulated signal, a plurality of correlations are determined from a received signal, using a fast Walsh transformation (FWT) computation. The largest correlation is identified from a plurality of correlations. A combination of transmitted signals providing the largest correlation is reconstructed. If an error is included, however, in correlations determined as a result of FWT computation due, for example, to noise or multipath transmission, a combination of signals not actually transmitted may be selected. Since a wireless LAN apparatus is desirably small, internal processes should be simplified as much as possible.

SUMMARY OF THE INVENTION

The present invention has been done in view of these circumstances and its object is to provide a receiving technology capable of high-precision estimation a transmitted signal from the results of Walsh transform.

A mode of practicing the invention is a receiver. The receiver according to the invention comprises: a receiving unit receiving a signal in which a Walsh code including a plurality of chips respectively generated from a plurality of phase indicating signals represents a symbol; a phase correction unit correcting a phase of the received signal to approach a selected one of phases at which the Walsh codes including the plurality of chips are assigned; a Walsh transform unit subjecting the corrected signal to Walsh transform in units of symbols so as to generate a plurality of correlations having phase components; an approximation unit computing approximated values indicating a magnitude of the plurality of correlations generated such that the closer to the phase at which the Walsh code is assigned, the larger the approximated value; and a selection unit selecting a single correlation by referring to the approximated values indicating the magnitude of the plurality of correlations and outputting a plurality of phase indicating signals corresponding to the selected correlation.

According to the receiver of the present invention, after the phase of the received signal is corrected to approach the phase at which a constellation point is to be assigned, approximation is performed so that, the closer to the phase at which the constellation point is to be assigned, the larger the approximated value, thus allowing the signal corresponding to a large value to be selected.

The Walsh codes included in the signal received by the receiving unit may be assigned to phases at which absolute values of an in-phase component and that of a quadrature-phase component of the Walsh code are equal to each other, and the approximation unit may compute the approximated value indicating the magnitude of the plurality of correlations generated so that, the closer the absolute value of an in-phase component of the correlation to that of a quadrature-phase component, the larger the approximated value.

More specifically, "phases at which absolute values of an in-phase component and that of a quadrature-phase component of the Walsh code are equal to each other" are $\pi/4$, $3\pi/4$, $5\pi/4$, $7\pi/4$ when the in-phase axis is a horizontal axis, the quadrature axis is a vertical axis and 0 is defined on the in-phase axis.

The phase correction unit may detect a phase error between a selected one of the phases at which the Walsh codes including a plurality of chips are assigned and a phase of the selected correlation selected by the selection unit, and correct the phase of the received signal so that the phase error becomes small. The phase correction unit may detect an error between the phase of the received signal and a selected one of phases at which the Walsh codes including a plurality of chips are assigned, and correct the phase of the received signal so that the error becomes small.

The phase correction unit may comprise: a frequency offset estimation unit estimating a frequency offset included in the received signal; an error estimation unit estimating a phase error of the received signal with respect to a selected one of the phases at which the Walsh codes including a plurality of chips are assigned, by statistically processing the received signal over a predetermined period of time; an error correction unit determining a phase rotation from the estimated frequency offset, in accordance with the predetermined period of time for the statistical process, and corrects the estimated phase error by the phase rotation thus determined; and a correction execution unit correcting the phase of the received signal in accordance with the phase error thus corrected. The error estimation unit may average the received signal over a predetermined period of time in the statistical process, and the error correction unit may determine the phase rotation from the estimated frequency offset, in accordance with a period of time calculated as a sum of a duration between the completion of the predetermined period of time in the error estimation unit and the start of correction by the correction execution unit, and half of the predetermined period of time in the error estimation unit. The correction execution unit may comprise: a detection unit for detecting the received signal using the corrected phase error; an equalizing unit subjecting the detected signal to an equalization process; a residual error estimation unit estimating a residual phase error included in the signal subjected to the equalization process; and a residual error correction unit correcting the phase of the signal subjected to the equalization process in accordance with the residual phase error thus estimated.

With this construction, the phase error is already corrected to a degree when the estimation of the residual phase error is started. Therefore, the residual phase error that remains to be estimated is relatively small so that the time required for estimation of the residual phase error is reduced. Since the estimation of phase error and the estimation of frequency offset are performed in parallel, a period of time required for estimation of the phase error is reduced.

The approximation unit may compute the approximated values indicating the magnitude of the plurality of correlations generated such that absolute values of an in-phase component and a quadrature-phase component are added. The approximation unit may compute the approximated values indicating the magnitude of the plurality of correlations generated, by multiplying by 0.5 the smaller of the absolute values of the in-phase component and the quadrature-phase component of the correlations, and by adding thereto the larger of the absolute values of the in-phase component and the quadrature-phase component of the correlations.

Detection of "phase error" may be determined by computation on complex numbers or by computation on phases.

The approximation unit may compute the approximated values indicating the magnitude of the plurality of correlations generated, by multiplying by 0.5 the smaller of the absolute values of the in-phase component and the quadrature-phase component of the correlations, adding thereto the larger of the absolute values of the in-phase component and the quadrature-phase component of the correlations, and subtracting therefrom a value obtained by multiplying, by a predetermined coefficient, a difference between the larger of the absolute values and the smaller of the absolute values. The approximation unit may compute the approximated values indicating the magnitude of the plurality of correlations generated, by determining a predetermined coefficient in accordance with an error between a selected one of phases at which the Walsh codes including the plurality of chips are assigned and the phase of the corrections, and weighting the correlations by the coefficient. The selection unit may select a single correlation by successively tournament comparing two approximated values indicating the magnitude of the plurality of correlations generated.

Another mode of practicing the invention is also a receiver. The receiver according to this mode comprises: a receiving unit receiving a signal; a frequency offset estimation unit estimating a frequency offset included in the received signal; a phase estimation unit estimating an initial phase by statistically processing the received signal over a predetermined period of time; an initial phase correction unit determining a phase rotation from the estimated frequency offset, in accordance with the predetermined period of time for the statistical process, and correcting the estimated initial phase by the phase rotation thus determined; and a demodulation unit demodulating the received signal in accordance with the corrected initial phase. The phase estimation unit may average the received signal over a predetermined period of time in the statistical process, and the initial phase correction unit may determine the phase rotation from the estimated frequency offset, in accordance with a period of time calculated as a sum of a duration between the completion of the predetermined period of time in the phase estimation unit and the start of demodulation by the demodulation unit, and half of the predetermined period of time in the phase estimation unit. The demodulation unit may comprise: a detection unit for detecting the received signal using the corrected initial phase; an equalizing unit subjecting the detected signal to an equalization process; a residual error estimation unit estimating a residual phase error included in the signal subjected to the equalization process; and a residual error correction unit correcting the phase of the signal subjected to the equalization process in accordance with the residual phase error thus estimated.

"Initial phase" refers to a phase difference between the signal received at a point of time and a constellation point to which the signal is assigned at that point of time. In case a signal is a burst signal, that point of time generally refers to the head of the burst signal. Here, however, the point of time may not necessarily be the head of the burst signal.

With this construction, the phase error is already corrected to a degree when the estimation of the residual phase error is started. Therefore, the residual phase error that remains to be estimated is relatively small so that the time required for estimation of the residual phase error is reduced. Since the estimation of phase error and the estimation of frequency offset are performed in parallel, a period of time required for estimation of the phase error is reduced.

Still another mode of practicing the invention is a receiving method. The method comprises the steps of: receiving a signal in which a Walsh code including a plurality of chips respectively generated from a plurality of phase indicating signals represents a symbol; correcting a phase of the received signal to approach a selected one of phases at which the Walsh codes including the plurality of chips are assigned; subjecting the corrected signal to Walsh transform in units of symbols so as to generate a plurality of correlations having phase components; computing approximated values indicating a magnitude of the plurality of correlations generated such that the closer to the phase at which the Walsh code is assigned, the larger the approximated value; and selecting a single correlation by referring to the approximated values indicating the magnitude of the plurality of correlations and outputting a plurality of phase indicating signals corresponding to the selected correlation.

The Walsh codes included in the signal received by the step of receiving may be assigned to phases at which absolute values of an in-phase component and that of a quadrature-phase component of the Walsh code are equal to each other, and the step of computing the approximated values computes the approximated value indicating the magnitude of the plurality of correlations generated so that, the closer the absolute value of an in-phase component of the correlation to that of a quadrature-phase component, the larger the approximated value. The step of correcting the phase may detect a phase error between a selected one of the phases at which the Walsh codes including a plurality of chips are assigned and a phase of the selected correlation, and correct the phase of the received signal so that the phase error becomes small. The step of correcting the phase may detect an error between the phase of the received signal and a selected one of phases at which the Walsh codes including a plurality of chips are assigned, and correct the phase of the received signal so that the error becomes small.

The step of correcting the phase may comprise the steps of: estimating a frequency offset included in the received signal; estimating a phase error of the received signal with respect to a selected one of the phases at which the Walsh codes including a plurality of chips are assigned, by statistically processing the received signal over a predetermined period of time; determining a phase rotation from the estimated frequency offset, in accordance with the predetermined period of time for the statistical process, and correcting the estimated phase error by the phase rotation thus determined; and correcting the phase of the received signal in accordance with the phase error thus corrected. The step of estimating the phase error may average the received signal over a predetermined period of time in the statistical process, and the step of correcting the estimated phase error may determine the phase rotation from the estimated frequency offset, in accordance with a period of time calculated as a sum of a duration between the completion of the predetermined period of time in the step of estimating the phase error and the start of correction in the step of correcting the phase of the received signal, and half of the predetermined period of time in the step of estimating the phase error. The step of correcting the phase of the received signal may comprise the steps of: detecting the received signal using the corrected phase error; subjecting the detected signal to an equalization process; estimating a residual phase error included in the signal subjected to the equalization process; correcting the phase of the signal subjected to the equalization process in accordance with the residual phase error thus estimated.

The step of computing the approximated values may compute the approximated values indicating the magnitude of the plurality of correlations generated such that absolute values of an in-phase component and a quadrature-phase component are added. The step of computing the approximated values may compute the approximated values indicating the magnitude of the plurality of correlations generated, by multiplying by 0.5 the smaller of the absolute values of the in-phase component and the quadrature-phase component of the correlations, and by adding thereto the larger of the absolute values of the in-phase component and the quadrature-phase component of the correlations.

The step of computing the approximated values may compute the approximated values indicating the magnitude of the plurality of correlations generated, by multiplying by 0.5 the smaller of the absolute values of the in-phase component and the quadrature-phase component of the correlations, adding thereto the larger of the absolute values of the in-phase component and the quadrature-phase component of the correlations, and subtracting therefrom a value obtained by multiplying, by a predetermined coefficient, a difference between the larger of the absolute values and the smaller of the absolute values. The step of computing the approximated values may compute the approximated values indicating the magnitude of the plurality of correlations generated, by determining a predetermined coefficient in accordance with an error between a selected one of phases at which the Walsh codes including the plurality of chips are assigned and the phase of the corrections, and weighting the correlations by the coefficient. The step of outputting the plurality of phase indicating signals may select a single correlation by successively tournament comparing two approximated values indicating the magnitude of the plurality of correlations generated.

Yet another mode of practicing the invention is a receiving method. The receiving method according to this mode comprises the steps of: receiving a signal; estimating a frequency offset included in the received signal; estimating an initial phase by statistically processing the received signal over a predetermined period of time; determining a phase rotation from the estimated frequency offset, in accordance with the predetermined period of time for the statistical process, and correcting the estimated initial phase by the phase rotation thus determined; and demodulating the received signal in accordance with the corrected initial phase.

The step of estimating the initial phase may average the received signal over a predetermined period of time in the statistical process, and the step of correcting the initial phase may determine the phase rotation from the estimated frequency offset, in accordance with a period of time calculated as a sum of a duration between the completion of the predetermined period of time in the step of estimating the initial phase and the start of demodulation in the step of demodulation, and half of the predetermined period of time in the step of estimating the initial phase. The step of demodulation may comprise the steps of: detecting the received signal using the corrected initial phase; subjecting the detected signal to an equalization process; estimating a residual phase error included in the signal subjected to the equalization process; and correcting the phase of the signal subjected to the equalization process in accordance with the residual phase error thus estimated.

Still another mode of practicing the invention is a program. The program causes a computer to execute the steps of: receiving via a wireless network a signal in which a Walsh code including a plurality of chips respectively generated from a plurality of phase indicating signals represents a symbol; correcting a phase of the received signal to approach a selected one of phases at which the Walsh codes including the plurality of chips are assigned; subjecting the corrected signal to Walsh transform in units of symbols so as to generate a plurality of correlations having phase components; computing approximated values indicating a magnitude of the plurality of correlations generated such that the closer to the phase, stored in a memory, at which the Walsh code is assigned, the larger the approximated value; and selecting a single correlation by referring to the approximated values indicating the magnitude of the plurality of correlations and outputting, from the memory, a plurality of phase indicating signals corresponding to the selected correlation.

The Walsh codes included in the signal received by the receiving unit may be assigned to phases at which absolute values of an in-phase component and that of a quadrature-phase component of the Walsh code are equal to each other, and the step of computing the approximated values computes the approximated value indicating the magnitude of the plurality of correlations generated so that, the closer the absolute value of an in-phase component of the correlation to that of a quadrature-phase component, the larger the approximated value. The step of correcting the phase may detect a phase error between a selected one of the phases at which the Walsh codes including a plurality of chips are assigned and a phase of the selected correlation, and correct the phase of the received signal so that the phase error becomes small. The step of correcting the phase may detect an error between the phase of the received signal and a selected one of phases at which the Walsh codes including a plurality of chips are assigned, and correct the phase of the received signal so that the error becomes small.

The step of correcting the phase may comprise the steps of: estimating a frequency offset included in the received signal; estimating a phase error of the received signal with respect to a selected one of the phases at which the Walsh codes including a plurality of chips are assigned, by statistically processing the received signal over a predetermined period of time; determining a phase rotation from the estimated frequency offset, in accordance with the predetermined period of time for the statistical process, and correcting the estimated phase error by the phase rotation thus determined; and correcting the phase of the received signal in accordance with the phase error thus corrected. The step of estimating the phase error may average the received signal over a predetermined period of time in the statistical process, and the step of correcting the estimated phase error may determine the phase rotation from the estimated frequency offset, in accordance with a period of time calculated as a sum of a duration between the completion of the predetermined period of time in the step of estimating the phase error and the start of correction in the step of correcting the phase of the received signal, and half of the predetermined period of time in the step of estimating the phase error. The step of correcting the phase of the received signal may comprise the steps of: detecting the received signal using the corrected phase error; subjecting the detected signal to an equalization process; estimating a residual phase error included in the signal subjected to the equalization process; correcting the phase of the signal subjected to the equalization process in accordance with the residual phase error thus estimated.

The step of computing the approximated values may compute the approximated values indicating the magnitude of the plurality of correlations generated such that absolute values of an in-phase component and a quadrature-phase component are added. The step of computing the approximated values may compute the approximated values indicating the magnitude of the plurality of correlations generated, by multiplying by 0.5 the smaller of the absolute values of the in-phase component and the quadrature-phase component of the correlations, and by adding thereto the larger of the absolute values of the in-phase component and the quadrature-phase component of the correlations.

The step of computing the approximated values may compute the approximated values indicating the magnitude of the plurality of correlations generated, by multiplying by 0.5 the smaller of the absolute values of the in-phase component and the quadrature-phase component of the correlations, adding thereto the larger of the absolute values of the in-phase component and the quadrature-phase component of the correlations, and subtracting therefrom a value obtained by multiplying, by a predetermined coefficient, a difference between the larger of the absolute values and the smaller of the absolute values. The step of computing the approximated values may compute the approximated values indicating the magnitude of the plurality of correlations generated, by determining a predetermined coefficient in accordance with an error between a selected one of phases at which the Walsh codes including the plurality of chips are assigned and the phase of the corrections, and weighting the correlations by the coefficient. The step of outputting the plurality of phase indicating signals may select a single correlation by successively tournament comparing two approximated values indicating the magnitude of the plurality of correlations generated.

Yet another mode of practicing the invention is a program. The program according to this mode causes a computer to execute the steps of: receiving a signal via a wireless network; estimating a frequency offset included in the received signal and storing the frequency offset in a memory; estimating an initial phase by statistically processing the received signal over a predetermined period of time and storing the initial phase in a memory; determining a phase rotation from the estimated frequency offset stored in the memory, in accordance with the predetermined period of time for the statistical process, and correcting the initial phase stored in the memory by the phase rotation thus determined; and demodulating the received signal in accordance with the corrected initial phase. The step of storing the initial phase in the memory may average the received signal over a predetermined period of time in the statistical process, and the step of correcting the initial phase may determine the phase rotation from the estimated frequency offset, in accordance with a period of time calculated as a sum of a duration between the completion of the predetermined period of time in the step of storing the initial phase in the memory and the start of demodulation in the step of demodulation, and half of the predetermined period of time in the step of storing the initial phase in the memory. The step of demodulation may comprise the steps of: detecting the received signal using the corrected initial phase; subjecting the detected signal to an equalization process; estimating a residual phase error included in the signal subjected to the equalization process and storing the residual phase error in the memory; and correcting the phase of the signal subjected to the equalization process in accordance with the residual phase error thus stored in the memory.

It is to be noted that any arbitrary combination or recombination of the above-described structural components and expressions changed to a method, a system, a computer program, a recording medium having stored computer programs therein, a data structure and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 11A-11H show a sequence of operations of FIG. 10.

DETAILED DESCRIPTION OF THE INVENTION

Figure 1:
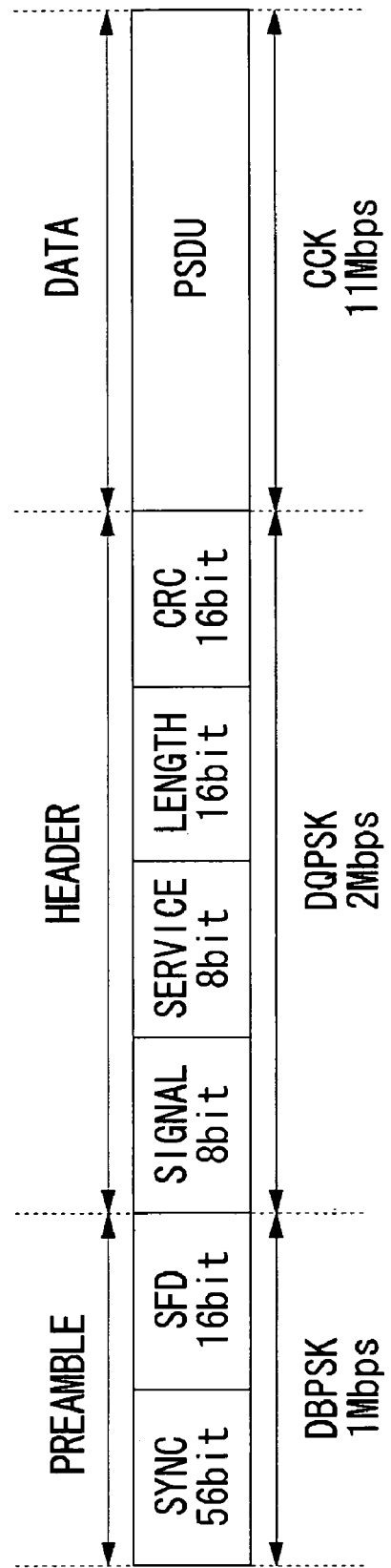
FIG. 1 shows a burst format in a communications system according to a first embodiment.

The invention will now be described based on the following embodiments which do not intend to limit the scope of the present invention but exemplify the invention. All of the features and the combinations thereof described in the embodiments are not necessarily essential to the invention.

FIRST EMBODIMENT

Before giving a specific description of the present invention, a summary of will be given. The first embodiment of the present invention relates to a wireless LAN receiver that complies with the IEEE 802.11b standard. The receiver subjects a CCK modulated signal included in a received signal to FWT computation. The receiver further selects the largest correlation from a plurality of correlations obtained as a result of FWT computation and reconstructs a combination of phase indicating signals corresponding to the largest correlation thus selected, as phase indicating signals included in CCK. A correlation is a complex number having an in-phase component and a quadrature-phase component. Normally, for determination of the magnitude of correlation, a square sum is calculated so that the volume of computation is relatively large. Further, in CCK, a chip signal is generated based on differentially encoded signals so that, normally, a receiver does not require correction of absolute phase.

The receiver according to the first embodiment performs approximation of the magnitude of correlation such that an error in approximation is larger as the correlation is removed from an in-phase axis and a quadrature axis. When an error resulting from approximation is large, the approximated value itself is large. Accordingly, the receiver corrects the absolute phase of a received signal before conducting FWT computation. As a result of this, the correlation to be finally selected is assigned to a phase that provides the largest approximated value. This results in the likelihood of the largest correlation being selected from a plurality of correlations becoming large so that the receiving performance of the receiver is improved.

As an introduction to the first embodiment of the invention, a brief description will be given of CCK modulation in the IEEE802.11b standard. In CCK modulation, 8 bits are grouped into one unit (hereinafter, this unit will be referred to as a CCK modulation unit). The 8 bits will be referred to as d1, d2, ... d8 in the descending order of digits. The lower 6 bits in the CCK modulation unit are mapped into the constellation diagram such that pairs [d3, d4], [d5, d6], [d7, d8] are mapped into the quadrature phase shift keying (QPSK) constellation points, respectively. The mapped phases will be denoted by ($\phi 2$, $\phi 3$, $\phi 4$), respectively. 8 spreading codes P1 through P8 are generated from the phases $\phi 2$, $\phi 3$, $\phi 4$, as given below.

$P1 = \phi 2 + \phi 3 + \phi 4$ $P2 = \phi 3 + \phi 4$ $P3 = \phi 2 + \phi 4$ $P4 = \phi 4$ $P5 = \phi 2 + \phi 3$ $P6 = \phi 3$ $P7 = \phi 2$ $P8 = 0$ (equation 1)

The higher two bits [d1, d2] of the CCK modulation unit are mapped into a constellation point of the differential encoding quadrature shift keying (DQPSK). The mapped phase will be denoted by $\phi 1$. $\phi 1$ corresponds to a spread signal. 8 chip signals X0 through X7 are generated from the spread signal $\phi 1$ and the spreading codes P1 through P8, as given below.

$X0 = e^{j(\phi 1 + P1)}$ $X1 = e^{j(\phi 1 + P2)}$ $X2 = e^{j(\phi 1 + P3)}$ $X3 = -e^{j(\phi 1 + P4)}$ $X4 = e^{j(\phi 1 + P5)}$ $X5 = e^{j(\phi 1 + P6)}$ $X6 = -e^{j(\phi 1 + P7)}$ $X7 = e^{j(\phi 1 + P8)}$ (equation 2)

A transmitter transmits the chip signals X0 through X7 in the stated order (hereinafter, a time sequence unit comprising the chip signals X0 through X7 will also be referred to as a CCK modulation unit).

In the IEEE802.11b standard, in addition to using CCK modulation, DBPSK and DQPSK phase modulated signals are spread by known spreading codes and transmitted.

FIG. 1 shows a burst format in a communications system according to the first embodiment of the present invention. The burst format corresponds to the short PLCP of the IEEE802.11b standard. As illustrated, the burst signal includes preamble, header and data fields. The preamble is transmitted at a transmission rate of 1 Mbps according to the DBPSK modulation scheme. The header is transmitted at a transmission rate of 2 Mbps according to the DQPSK modulation scheme. The data are transmitted at a transmission rate of 11 Mbps according to the CCK modulation scheme. The preamble includes SYNC of 56 bits and SFD of 16 bits. The header includes SIGNAL of 8 bits, SERVICE of 8 bits, LENGTH of 16 bits and CRC of 16 bits. The length of PSDU corresponding to the data is variable.

Figure 2:
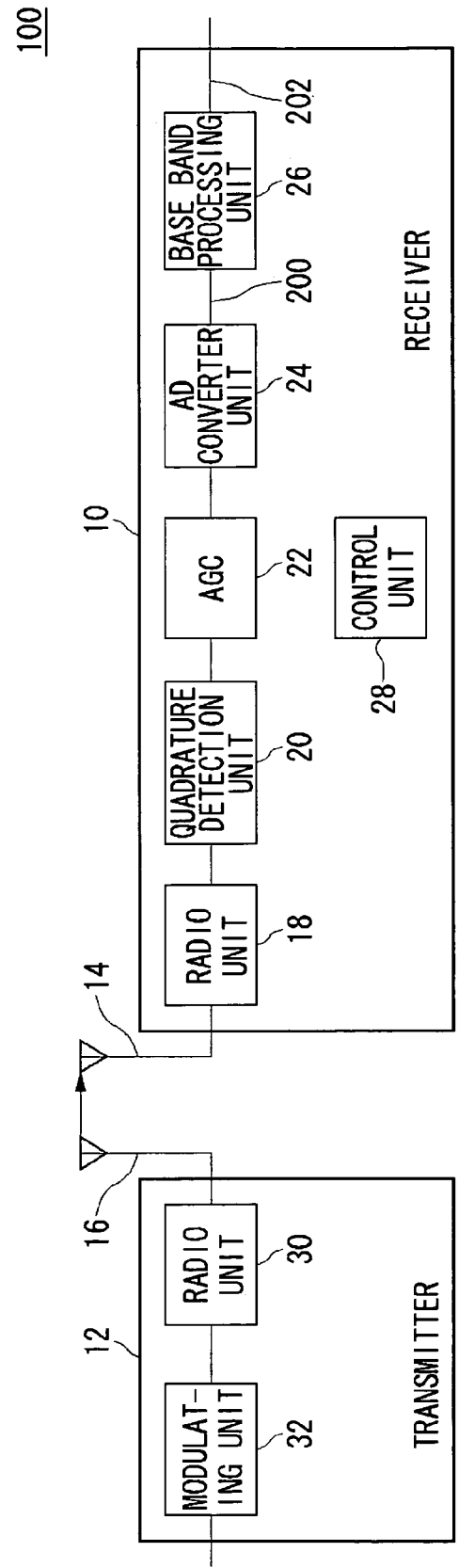
FIG. 2 shows a construction of the communications system according to the first embodiment.

FIG. 2 shows a construction of a communications system 100 according to the first embodiment. The communications system includes a receiver 10 and a transmitter 12. The receiver 10 includes a receiving antenna 14, a radio unit 18, a quadrature detection unit 20, an AGC 22, an AD converter unit 24, a base band processing unit 26 and a control unit 28. The transmitter 12 includes a transmission antenna 16, a radio unit 30 and a modulating unit 32. The signals involved include a digital received signal 200 and an output signal 202.

As described before, the modulating unit 32 subjects information to be transmitted to CCK modulation or subjects a phase modulated signal to spreading. The radio unit 30 subjects a base band signal output from the modulation unit 32 to frequency conversion and amplification to obtain a radio frequency signal. The transmission antenna 16 transmits the radio frequency signal and the receiving antenna 14 receives the radio frequency signal.

The radio unit 18 subjects the received radio frequency signal to frequency conversion to obtain an intermediate frequency signal. The quadrature detection unit 20 subjects the intermediate frequency signal to quadrature detection so as to output a base band signal. Generally, the base band signal is illustrated as comprising an in-phase component and a quadrature-phase component. FIG. 2, however, illustrates the components as being combined. An AGC 22 automatically controls the gain so as to fit the amplitude of the base band signal in a dynamic range of an AD converter unit 24 described later. The AD converter unit 24 converts the analog base band signal to a digital signal so as to output the digital received signal 200 composed of a plurality of bits. The base band processing unit 26 subjects the digital received signal 200 to despreading or demodulation so as to output the output signal 202. The control unit 28 controls the timing to be observed in the receiver 10.

Figure 3:
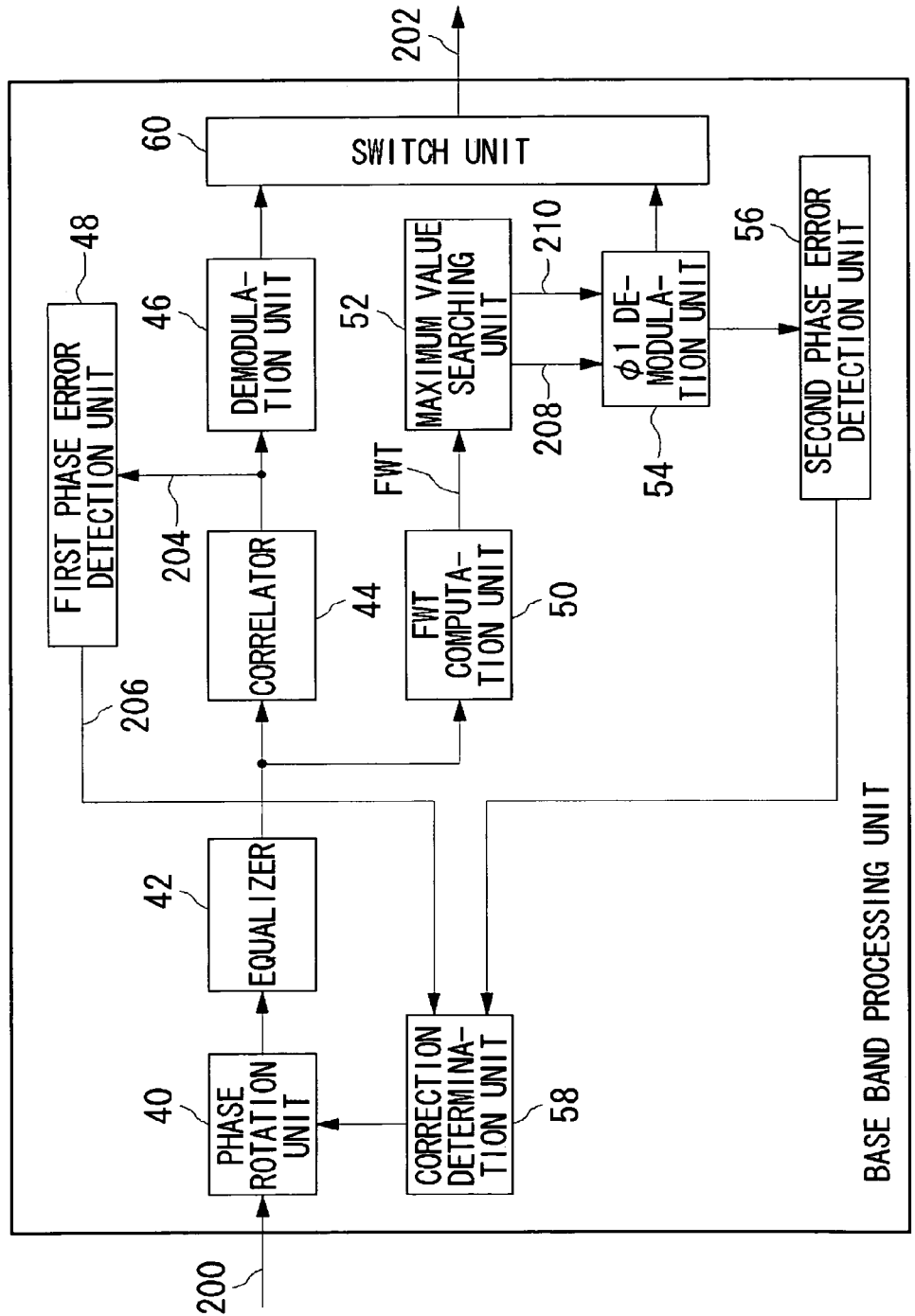
FIG. 3 shows a construction of a base band processing unit of FIG. 2.

FIG. 3 shows a construction of the base band processing unit 26. The base band processing unit 26 comprises a phase rotation unit 40, an equalizer 42, a correlator 44, a demodulation unit 46, a first phase error detection unit 48, a FWT computation unit 50, a maximum value searching unit 52, a φ1 demodulation unit 54, a second phase error detection unit 56, a correction determination unit 58 and a switch unit 60. The signals involved include a despreading signal 204, a phase error signal 206, a φ1 signal 208 and a φ component signal 210 and a Walsh transform value FWT.

A phase rotation unit 40 rotates the phase of the digital received signal 200 in accordance with a correction signal output from the correction determination unit 58 described later. As a result of rotation, the constellation point of the digital received signal 200 is located at the neighborhood of π/4, 3π/4, 5π/4 or 7π/4, phases intermediate between the in-phase axis and the quadrature axis. The rotation by the phase rotation unit 40 may be effected by vector computation on components of complex numbers or addition and subtraction in phase components.

The equalizer 42 eliminates effects from multipath transmission included in the signal output from the phase rotation unit 40. The equalizer 42 is composed of filters of a transversal type. DFE may be added to the filters of a transversal type. The equalizer 42 may output the input signal intact until tap coefficients of the equalizer 42 are set.

The correlator 44 subjects the signal output from the equalizer 42 to a correlating process using predetermined spreading codes, so as to despread the phase modulated signals, such as the preamble and the header of the bust format of FIG. 1, spread by the same predetermined spreading codes. The correlation may be a process of a sliding type or a process of a matched filter type. As described, the correlator 44 operates only on the preamble and the header in the burst format of FIG. 1. When the data are phase modulated signals spread by predetermined spreading codes, the correlator 44 also operates on the data portion.

The demodulator 46 demodulates the despreading signal 204 processed for despreading by the correlator 44. The modulation scheme of the despreading signal 204 is DBPSK or DQPSK so that demodulation is performed using differential detection.

The first phase error detection unit 48 detects a phase error in accordance with the despreading signal 204. The detected phase error is output as the phase error signal 206. Details will be described later.

The FWT computation unit 50 subjects the CCK modulated signal such as the data field of the burst format of FIG. 1 to FWT computation so as to output Walsh transform values FWT. More specifically, the FWT computation unit 50 receives the chip signals, CCK modulation units, and outputs correlations, 64 Walsh transform values FWT, by processing correlation between the chip signals.

The maximum value searching unit 52 receives the 64 Walsh transform values FWT and selects a single Walsh transform value FWT in accordance with the magnitude of the values. Further, in accordance with the selected Walsh transform value FWT, the maximum value searching unit 52 outputs the φ1 signal 208 and the φ component signal 210, the φ1 signal corresponding to the signal prior to φ1 differential detection and the φ component signal 210 being a combination of signals at phases φ2 through φ4.

The φ1 demodulation unit 54 subjects the φ1 signal 208 to differential detection so as to generate the signal characterized by phase φ1. The φ1 demodulation unit 54 further reconstructs information bits d1, d2 ... d8 for output from the combination of the signals characterized by phases φ1 through φ4.

The second phase error detection unit 56 detects a phase error in accordance with an output signal from the φ1 demodulation unit 54. Detection is done in a similar manner as the first phase error detection unit 48.

The correction determination unit 58 outputs a signal to rotate the phase of the digital received signal 200 in the phase rotation unit 40. The correction determination unit 58 outputs the phase error detected by the first phase error detection unit 48 in an interval including the preamble and header fields of FIG. 1, and outputs the phase error detected by the second phase error detection unit 56 in the interval including the data field of the burst format.

The switch unit 60 selects one of the signal output from the demodulation unit 46 and the signal output from the φ1 demodulation unit 54 and outputs the output signal 200 accordingly. In an interval including the preamble and header fields of FIG. 1, the switch unit 60 selects the signal output from the demodulation unit 46 and selects the signal output from the φ1 demodulation unit 54 in an interval including the data field of the burst format. The switch unit 60 outputs an inverse of the selected signal.

The construction as described above may be implemented by hardware including a CPU, a memory and an LSI and by software including a program provided with reservation and management functions loaded into the memory. FIG. 3 depicts function blocks implemented by cooperation of the hardware and software. Therefore, it will be obvious to those skilled in the art that the function blocks may be implemented by a variety of manners including hardware only, software only or a combination of both.

Figure 4:
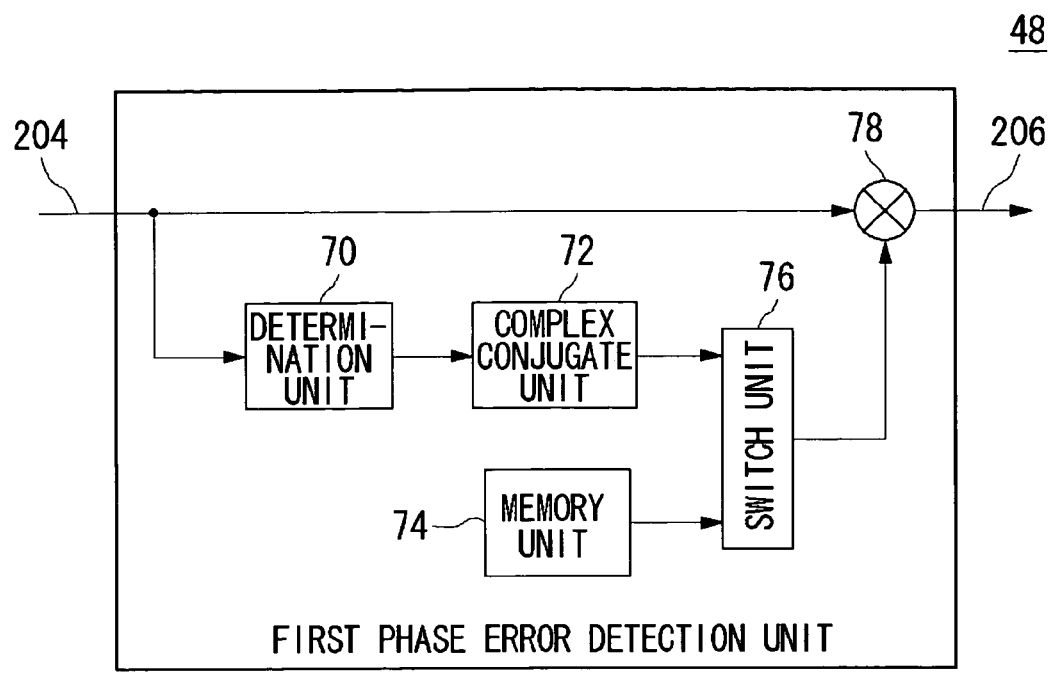
FIG. 4 shows a construction of a first phase error detection unit of FIG. 3.

FIG. 4 shows a construction of the first phase error detection unit 48. The first phase error detection unit 48 includes a storage unit 74, a determination unit 70, a complex conjugate unit 72, a switch unit 76 and a multiplication unit 78.

The storage unit 74 stores a known signal corresponding to the preamble field of the burst format of FIG. 1 and outputs the known signal at a point of time corresponding to the preamble field.

The determination unit 70 determines the value of the despreading signal 204 in a time interval for the header field of the burst format of FIG. 1, in accordance with a predetermined threshold value for determination. The determination is made both for the in-phase component and the quadrature-phase component of the despreading signal 204.

The complex conjugate unit 72 calculates a complex conjugate of the signal subject to determination by the determination unit 70.

The switch unit 76 outputs a signal from the storage unit 74 in a time interval for the preamble and outputs a signal from the complex conjugate unit 72 in a time interval for the header field.

The multiplication unit 78 multiplies a reference signal output from the switch unit 76 with the despreading signal 204 so as to output an error of the despreading signal 204 with respect to the reference signal as the phase error signal 206.

Figure 5:
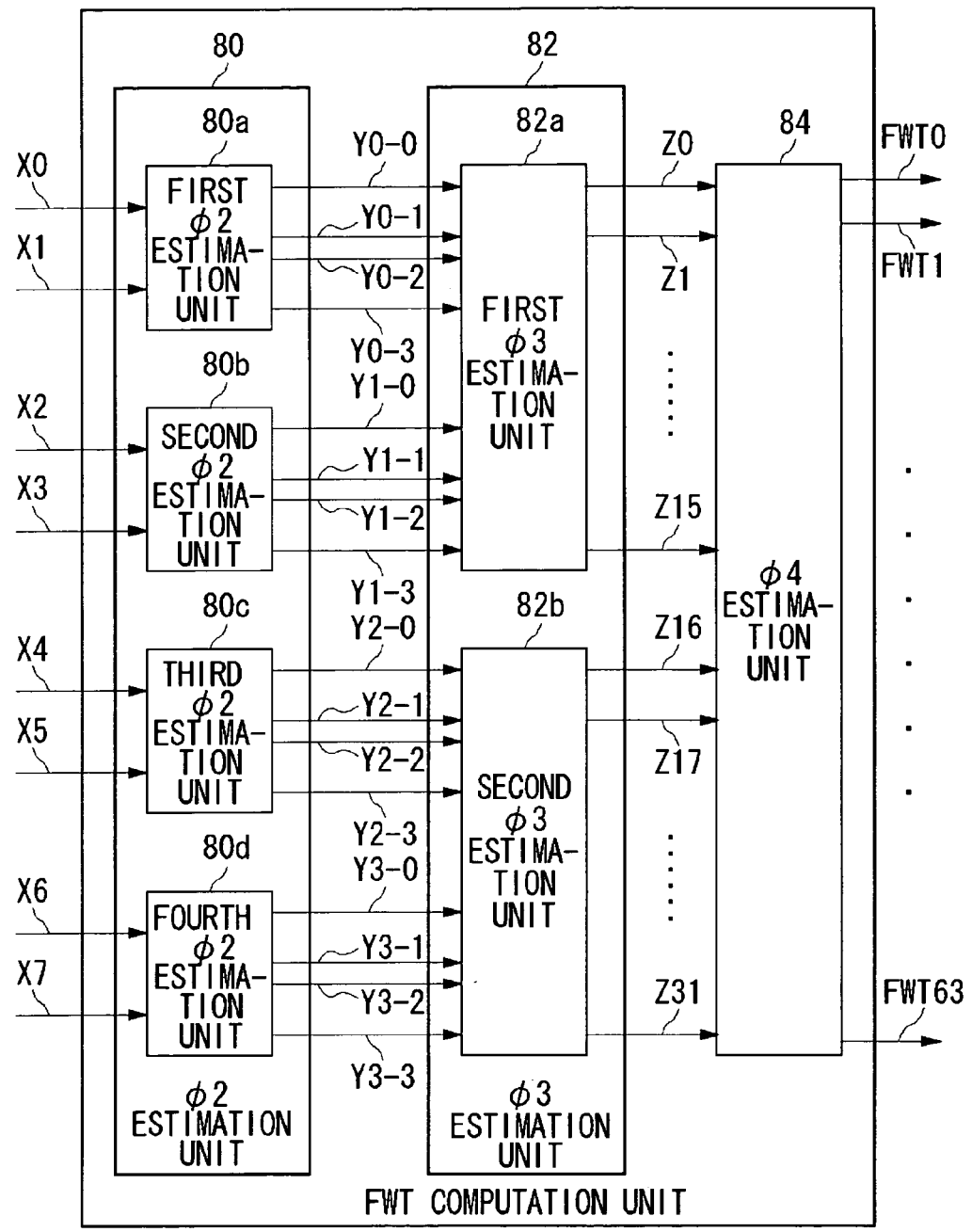
FIG. 5 shows a construction of a FWT computation unit of FIG. 3.

FIG. 5 shows a construction of the FWT computation unit 50. The FWT computation unit 50 includes a first φ2 estimation unit 80a, a second φ2 estimation unit 80b, a third φ2 estimation unit 80c and a fourth φ2 estimation unit 80d, generically referred to as a φ2 estimation unit 80, and a first φ3 estimation unit 82a, a second φ3 estimation unit 82b, a third φ3 estimation unit 82c and a fourth φ3 estimation unit 82d, generically referred to as a φ3 estimation unit 82. The signals involved include Y0-0, Y0-1, Y0-2, Y0-3, Y1-0, Y1-1, Y1-2, Y1-3, Y2-0, Y2-1, Y2-2, Y2-3, Y3-0, Y3-1, Y3-2, Y3-3, generically referred to as a first correlation Y, and Z0, Z1, Z15, Z16, Z17 and Z31, generically referred to as a second correlation Z, and FWT0, FWT1 and FWT63, generically referred to as a Walsh transform value FWT.

The φ2 estimation unit 80 each receive two chip signals X. For example, a unit receives X0 and X1, rotate the phase of X0 by $\pi/2$, $\pi$ and $3\pi/2$, add X1 and X0 thus rotated so as to output Y0-1 through Y0-3, respectively. When the phase of X0 thus rotated equals the phase φ2, a first correlation Y resulting from the addition is corresponding large. This is how the phase φ2 is estimated.

The φ3 estimation unit 82 operates similarly as the φ2 estimation unit 80. For example, the φ3 estimation unit 82 receives Y0-0 through Y0-3 and Y1-0 through Y1-3 so as to output Z0 through Z15. φ3 is estimated by referring to the magnitude of a second correlation Z. The φ4 estimation unit 84 operates similarly to the φ2 estimation unit 80. The φ4 estimation unit 84 receives Z0 through Z31 so as to output FWT0 through FWT 63. φ4 and φ1 are estimated by referring to the magnitude of the Walsh transform values FWT.

Figure 6:
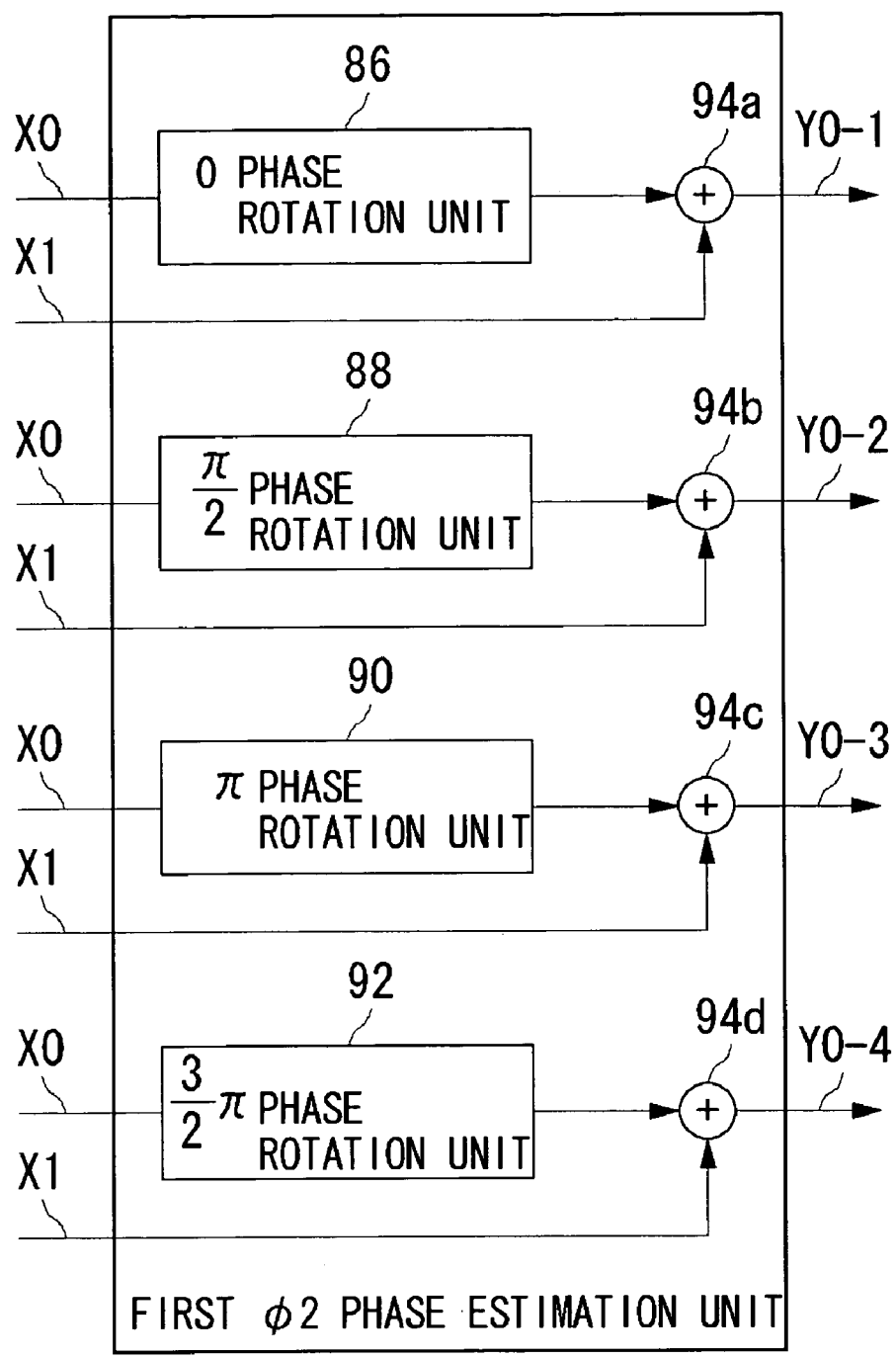
FIG. 6 shows a construction of a first $\phi 2$ estimation unit of FIG. 5.

FIG. 6 shows a construction of the first φ2 estimation unit 80a. The first φ2 estimation unit 80a includes a 0 phase rotation unit 86, a $\pi/2$ phase rotation unit 88, a $\pi$ phase rotation unit 90, a $3/2\pi$ phase rotation unit 92, a first addition unit 94a, a second addition unit 94b, a third addition unit 94c and a fourth addition unit 94d, generically referred to as an addition unit 94.

The 0 phase rotation unit 86, the $\pi/2$ phase rotation unit 88, the $\pi$ phase rotation unit 90, the $3/2\pi$ phase rotation unit 92 rotate the phase of X0 by 0, $\pi/2$, $\pi$, $3\pi/2$, repectively. The outputs are added to X1 in the addition unit 94.

Figure 7:
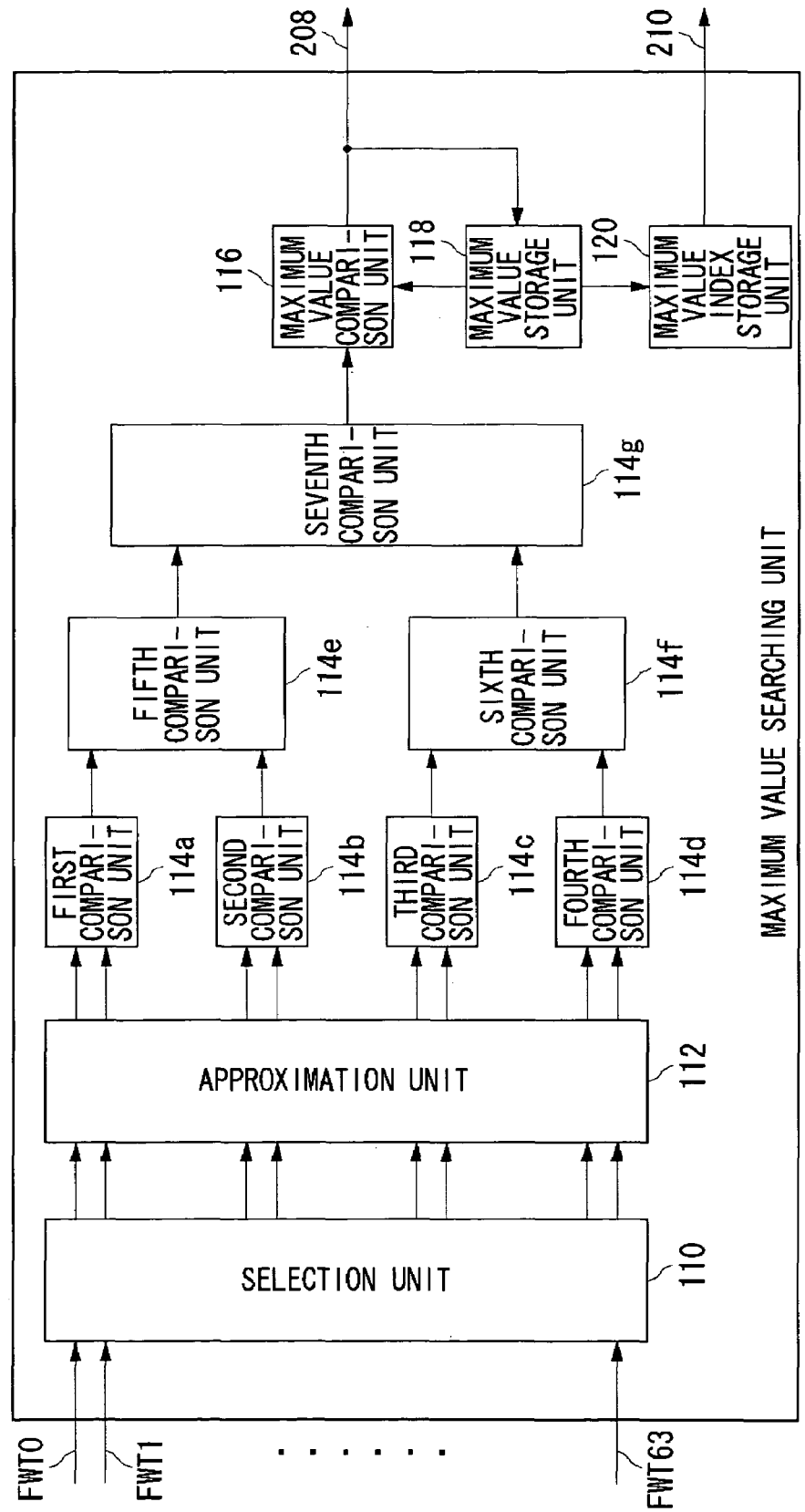
FIG. 7 shows a construction of maximum value searching unit of FIG. 3.

FIG. 7 shows a construction of the maximum value searching unit 52. The maximum value searching unit 52 includes a selection unit 110, an approximation unit 112, a first comparison unit 114a, a second comparison unit 114b, a third comparison unit 114c, a fourth comparison unit 114d, a fifth comparison unit 114e a sixth comparison unit 114f, a seventh comparison unit 114g, generically referred to as a comparison unit 114, a maximum value comparison unit 116, a maximum value storage unit 118 and a maximum value Index storage unit 120.

The selection unit 110 receives 64 data items FWT0 through FWT63 and outputs the data in units of 8 items. For example, the selection unit 110 outputs FWT0 through FWT7 initially and subsequently outputs FWT8 through FWT15.

The approximation unit 112 determines the magnitude of Walsh transform value FWT by approximation. Assuming that the in-phase component and quadrature-phase component of a Walsh transform FWT are denoted by I and Q, the magnitude R is given by a sum of absolute values.

$$R=|I|+|Q| \quad \text{(equation 3)}$$

The comparison unit 114 compares R for eight data items with each other and selects the largest Walsh transform value FWT.

The maximum value comparison unit 116 compares a selected one of FWT0 through FWT63 with the maximum value determined from a previous search in the 8 Walsh transform values FWT, so as to selected the larger of the compared values. Finally, the maximum value comparison unit 116 selects the largest Walsh transform value FWT from FWT0 through FWT63. The selected Walsh transform value FWT is stored in the maximum value storage unit 118.

The maximum value Index storage unit 120 outputs a combination of phases φ2 through φ4 corresponding to the maximum Walsh transform value FWT stored in the maximum value storage unit 118.

Figure 8:
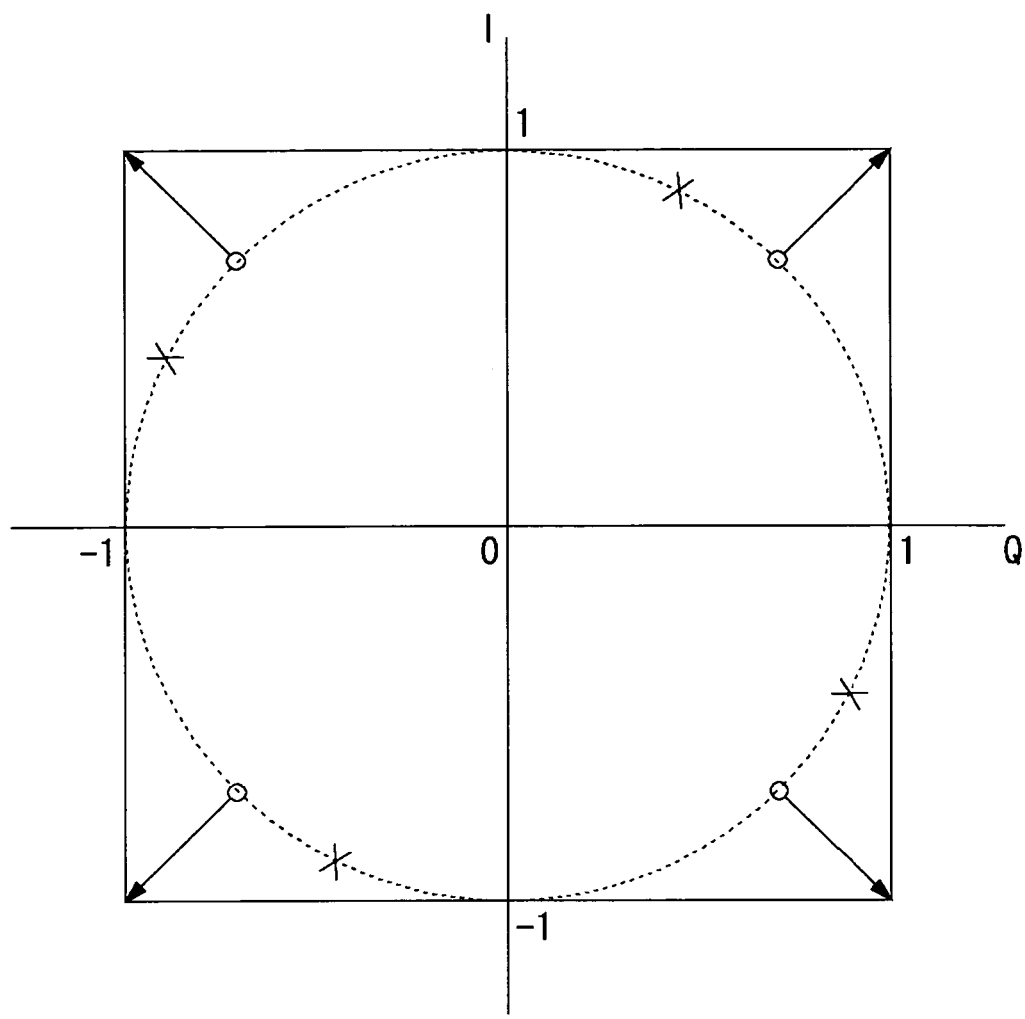
FIG. 8 is a constellation diagram of signals subjected to Walsh transform to be selected by the maximum value searching unit of FIG. 3.

FIG. 8 shows a constellation of the Walsh transform values FWT to be selected by the maximum value searching unit 52. The I-axis and the Q-axis in the figure represent an in-phase axis and a quadrature axis, respectively. Points indicated by o in the figure represent a constellation of ideal Walsh transform values FWT in a case where there is no phase error. A dotted line indicates a plot of equal magnitudes of Walsh transform values FWT determined as a normal square sum. The square in the figure indicates the equal magnitudes of the Walsh transform values FWT determined as an absolute sum and corresponding to the dotted line. The values "1" and "−1" shown on the I-axis and the Q-axis are normalized Walsh transform values FWT. Actual Walsh transform values FWT may be different. A displacement between the square and the dotted line indicates an error occurring as a result of approximation. The error is large at $\pi/4$, $3\pi/4$, $5\pi/4$ and $7\pi/4$. Since the approximated value is larger than the non-approximated value at phases at which the constellation points of the Walsh transform values FWT are located, as illustrated, the likelihood of the Walsh transform values FWT assigned to those phases being selected is increased so that the receiving performance is improved. When a phase error occurs, the constellation points of the Walsh transform values FWT are indicated by x in the figure. Therefore, the likelihood of those Walsh transform values FWT being selected is decreased so that there is a possibility that the receiving performance is degraded. In order to prevent this from taking place, the phase rotation unit 40 of the first embodiment effects phase rotation.

A description will now be given of the operation of the receiver 10 according to the first embodiment. In time intervals for the preamble and header fields, the correlator 44 despreads the signal equalized by the equalizer 42. The demodulation unit 46 demodulates the resultant signal so as to output the output signal 202. The first phase error detection unit 48 detects a phase error from the despreading signal 204. The phase rotation unit 40 corrects the phase of the digital received signal 200 in accordance with the phase error thus detected. In a time interval for data, the FWT computation unit 50 subjects the signal equalized by the equalizer 42 to FWT computation so as to determine Walsh transform values FWT. The maximum value searching unit 52 determines the magnitude of Walsh transform values FWT as a sum of absolute values, and outputs a combination of signals at phases φ2 through φ4 corresponding to the largest Walsh transform value FWT. The φ1 demodulation unit 54 outputs a signal at φ1. The second phase error detection unit 56 detects a phase error from the output signal of the φ1 demodulation unit 54. The phase rotation unit 40 corrects the phase of the digital received signal 200 in accordance with the phase error thus detected.

According to the first embodiment of the present invention, the magnitude of correlations resulting from FWT computation is determined as a sum of absolute values so that the required volume of computation is reduced. Since the absolute phase of the received signal is corrected before determining the largest correlation, the receiving performance is improved by approximation of the magnitude of correlations using a sum of absolute values.

SECOND EMBODIMENT

In a similar configuration as the first embodiment, the second embodiment of the present invention relates to a wireless LAN receiver that complies with the IEEE802.11b standard. The magnitude of correlations resulting from FWT computation is determined as a sum of absolute values. The method employed for correction of an absolute phase according to the second embodiment is different from that of the first embodiment.

Figure 9:
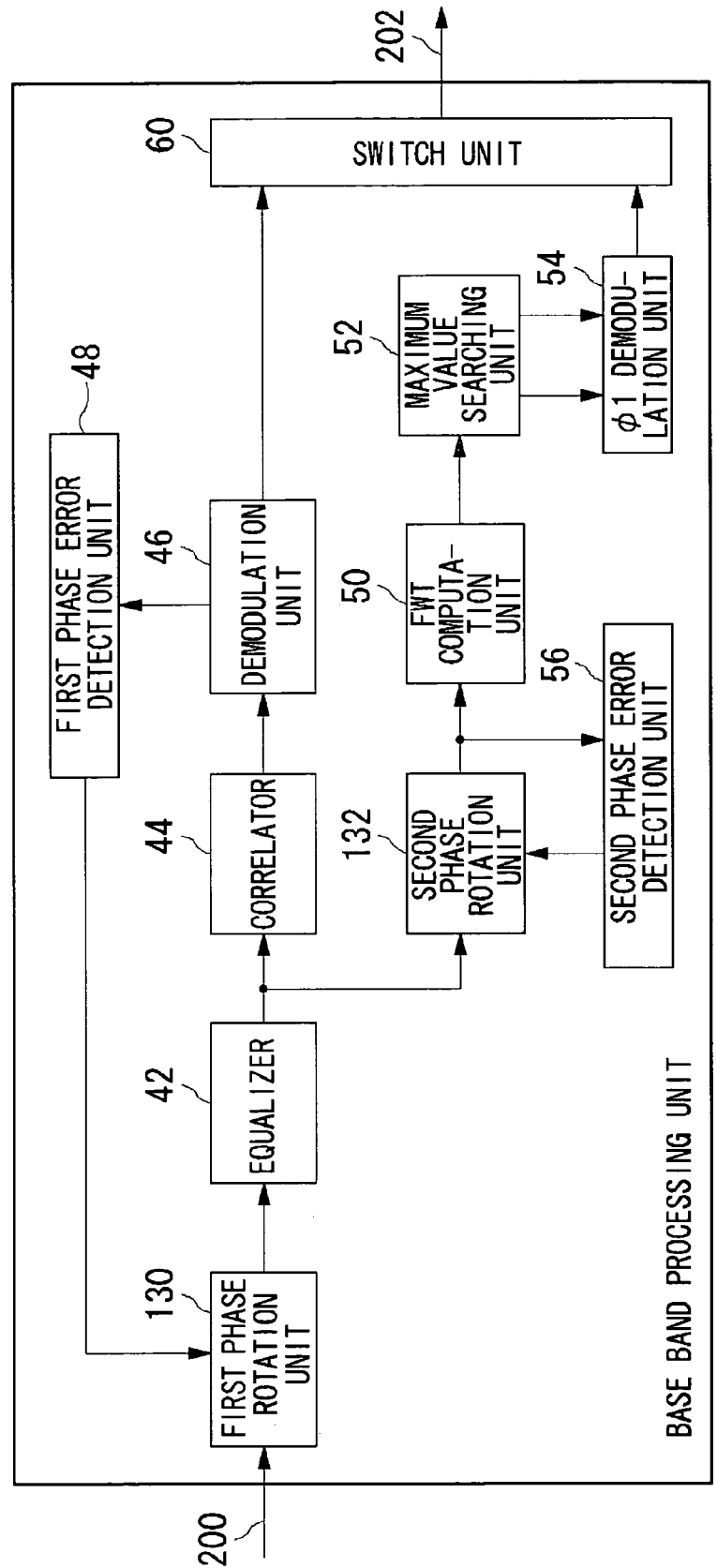
FIG. 9 shows a construction of a base band processing unit according to a second embodiment of the present invention.

FIG. 9 shows a construction of the base band processing unit 26 according to the second embodiment. Unlike the base band processing unit 26 of FIG. 3, the base band processing unit 26 of FIG. 9 includes a first phase rotation unit 130 and a second phase rotation unit 132.

Like the phase rotation unit 40, the first phase rotation unit 130 rotates the phase of the digital received signal 200. A difference is that the first phase rotation unit 130 rotates the phase in accordance with a phase error detected by the first phase error detection unit 48. The phase of the digital received signal 200 may also be rotated such that a phase error between the phase of the digital received signal 200 and any of the phases at which the Walsh codes are assigned becomes small.

The second phase rotation unit 132 rotates the signal equalized by the equalizer 42 in accordance with a phase error detected by the second phase error detection unit 56.

According to the second embodiment, processing delay that elapses since the detection of phase error until the rotation of the signal is small so that a phase error is properly corrected even when a residual frequency error included in the signal is relatively large.

THIRD EMBODIMENT

In a similar configuration as the second embodiment, the third embodiment of the present invention relates to a method of correcting an absolute phase of a received signal. As described before, the receiving performance in CCK modulation in a multipath environment is improved if an absolute phase is corrected. Correction of an absolute phase is generally performed by a control in which an error signal of a certain type is fed back. This may result in an extended period of time elapsing until the phase is converged to a target value as a result of the control. Estimation of an absolute phase, however, should be substantially converged in a time period for the preamble of the burst signal. The period of time required for convergence of the phase is desirably as short as possible. Associated with this, an object of the third embodiment is to provide a receiving technology in which estimation of the phase is converged at a high speed.

The receiver according to the third embodiment estimates an initial phase by averaging a received signal in parallel with a process for estimating a frequency offset from the received signal. When the initial phase is estimated, the initial phase value is corrected in accordance with the frequency offset. The received signal is then subject to detection using the initial phase value thus corrected. The signal subjected to detection is then subject to an equalizing process. A phase error that remains in the equalized signal is estimated. Finally, the receiver performs CCK demodulation on the signal corrected for the residual phase error. In this construction, the estimation of a frequency offset and the estimation of an initial phase are performed in parallel upon receipt of received signal so that estimation of an initial phase is completed efficiently. Since the initial phase has been corrected to a degree when the estimation of the residual phase error is started, the estimation of the residual phase error is efficiently performed. By estimating the residual error from the equalized signal in which multipath signal components are reduced in level, the estimation of the residual phase error is performed with a high precision.

Figure 10:
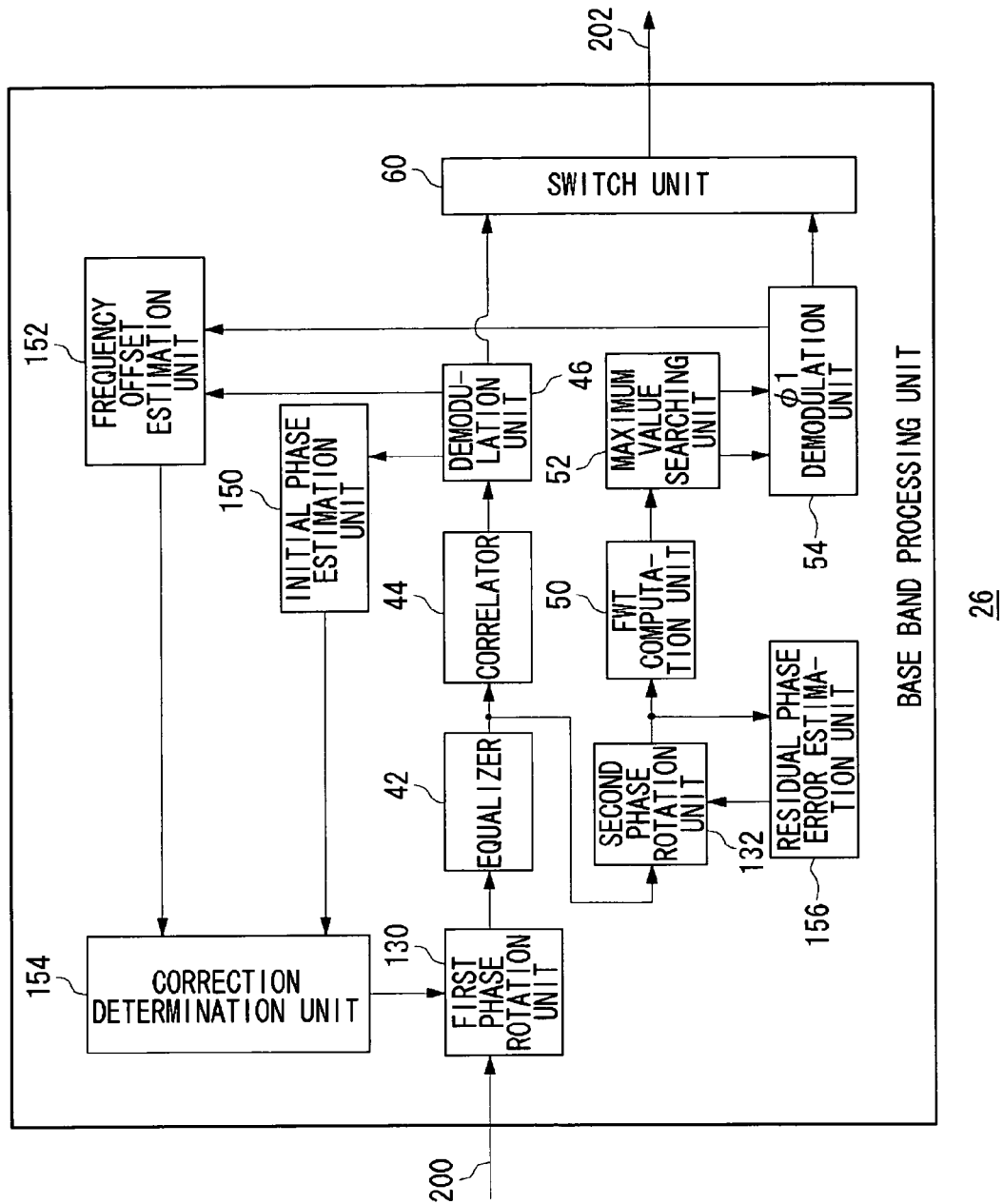
FIG. 10 shows a construction of a base band processing unit according to a third embodiment of the present invention.

FIG. 10 shows a construction of the base band processing unit 26 according to the third embodiment. Unlike the base band processing unit 26 of FIG. 9, the base band processing unit 26 of FIG. 10 includes an initial phase estimation unit 150, a frequency offset estimation unit 152, a correction determination unit 154 and a residual phase estimation unit 156.

The first phase rotation unit 130 corrects the phase of the digital received signal 200 by the corrected initial phase supplied from the correction determination unit 154. The above operation corresponds to the operation of detecting the digital received signal 200 in accordance with the phase output from the correction estimation unit 154. The first phase rotation unit 130 outputs the input digital received signal 200 intact until the corrected initial phase is output from the correction determination unit 154.

The frequency offset estimation unit 152 estimates a frequency offset included in the digital received signal 200. A method of estimating the frequency offset will be described later. The frequency offset estimation unit 152 measures a phase difference between predetermined chips in the signal output from the demodulation unit 46 in a time period for SYNC of the bust signal. The measured phase difference is divided by a period of time corresponding to an interval between predetermined chips so as to determine a frequency offset. Since the signal component for SYNC is known, it is assumed that the signal component SYNC is eliminated when the phase difference is measured. Even when the SYNC period is over, the frequency offset estimation unit 152 successively estimates the frequency offset over the entire period of time in which the burst signal lasts. When the burst signal is subjected to CCK modulation, the signal output from the demodulation unit 46 or the signal output from the $\phi1$ demodulation unit 54 is used.

The initial phase estimation unit 150 estimates an initial phase of the digital received signal 200, i.e. a phase error between the constellation point at which the SYNC signal is assigned and the digital received signal 200. A specific embodiment of initial phase estimation will be described later. The initial phase estimation unit 150 receives the signal output from the demodulation unit 46 in a time period for SYNC of the burst signal. After eliminating the signal component for SYNC from the input signal, a statistical process such as averaging is executed for reduction of noise components. The averaged result is determined as an initial phase. Assuming that a period of time for taking an average is a symbol period consisting of a plurality of chips, a phase difference is created between a point of time when the averaging is started and a point of time when the averaging is completed because a frequency offset is included in the input signal. Therefore, the averaged result corresponds to a phase at a point of time intermediate in the predetermined period of time for averaging. It is assumed here that the frequency offset remains constant.

The correction determination unit 154 receives the frequency offset from the frequency offset estimation unit 152 and receives the initial phase from the initial phase estimation unit 150. As mentioned above, the initial phase corresponds to a phase occurring at a point of time intermediate in a period of time for averaging. Therefore, the initial phase is corrected in accordance with the frequency offset. Given that the initial phase is θS, the frequency offset is Δω, and a period of time that elapses from a point of time corresponding to the initial phase is t, the initial phase θS' corrected by the correction determination unit 154 is given as below.

$$\theta S' = \theta S + \Delta\omega * t \quad \text{(Equation 4)}$$

The corrected initial phase θS' is output to the first phase rotation unit 130. The time t in equation 4 is determined as described below. In a case where the first phase rotation unit 130 corrects the digital received signal 200 immediately after the initial phase estimation unit 150 estimates the initial phase, time t is defined as half of the period of time for averaging. In a case where the first phase rotation unit 130 corrects the digital received signal 200 after an elapse of a predetermined period of time for, for example, one symbol, time t is defined as half of the period of time for averaging plus the period of time for one symbol. In a given burst signal, the input initial phase is maintained. The frequency offset, however, is updated successively depending on the output from the frequency offset estimation unit 152.

The residual phase estimation unit 156 estimates the residual phase error included in the signal output from the equalizer 42, after the first phase rotation unit 130 starts correcting the digital received signal 200. An error between the phase of the signal output from the first phase rotation unit 132 and the phase at which the signal is to be located in the constellation. Since the first phase rotation unit 130 has corrected the digital received signal 200 when the estimation of residual phase error is started by the residual phase estimation unit 156, it is expected that the residual phase error is reduced in level to an extent.

FIGS. 11A-11H show a sequence of operations. FIG. 11A shows a format of the burst signal received. The format is the same as that illustrated in FIG. 1. FIG. 11B shows a state of operation of the base band processing unit 26 for the burst signal of the format of FIG. 11A. "Carrier detection" indicates a state in which the radio unit 18 FIG. 1 detects the presence of burst signal. "Synchronization capture" indicates a state in which a timing detection unit (not shown) captures the timing synchronization of the burst signal. "Frequency and phase estimation" indicates a state in which the initial phase estimation unit 150 and the frequency offset estimation unit 152 of FIG. 10 estimate the initial phase and the frequency offset, respectively. The above-described processes are performed in a portion of the time period for SYNC in the burst signal. "SFD detection" indicates a state in which a detection unit (not shown) detects SFD included in the burst signal in a time period covering SFD and a portion of SYNC in the burst signal. "Header demodulation" indicates a state in which the receiver 10 demodulates the header included in the burst signal in a time period for the header in the burst signal. "Data demodulation" indicates a state in which the receiver demodulates a data signal included in the burst signal in a time period for data in the burst signal.

FIG. 11C shows a state of the demodulation process in the base band processing unit 26. The base band processing unit 26 corresponds to "Barker despreading+DPSK demodulation" performed in the correlator 44 and the demodulation unit 46, and also to "CCK demodulation" performed in the FWT computation unit 50, the maximum value searching unit 52 and the φ1 demodulation unit 54. "Barker despreading+DPSK demodulation" is done in a time period for SYNC, SFD and the header of the burst signal. "CCK demodulation" is done in a time period for data in the burst signal. FIG. 11D shows a state of operation of the frequency offset estimation unit 152. In "frequency and phase estimation" of FIG. 11B, the frequency offset estimation unit 152 estimates the frequency offset in accordance with the signal output from the demodulation unit 46. When "frequency and phase estimation" is completed, the frequency offset estimation unit 152 outputs the frequency offset to the correction determination unit 154. Subsequently, the frequency offset estimation unit 152 continues to estimate the frequency offset so as to output the same to the correction estimation unit 154 successively. In "data demodulation" of FIG. 11B, the frequency offset estimation unit 152 estimates the frequency offset in accordance with the signal output from the φ1 demodulation unit 54. FIG. 11E shows a state of operation of the initial phase estimation unit 150. The initial phase estimation unit 150 estimates an initial phase in a portion of the time interval for "frequency and phase estimation" of FIG. 11B and outputs the same to the correction determination unit 154 when "frequency and phase estimation" is completed.

FIG. 11F shows a state of operation of the correction determination unit 154 and the first phase rotation unit 130. When "frequency and phase estimation" of FIG. 11B is completed, the correction determination unit 154 receives the frequency offset from the frequency offset estimation unit 152 and the initial phase from the initial phase estimation unit 150 so as to correct the initial phase in accordance with the inputs. Subsequently, the correction determination unit 154 continues to update the corrected initial phase in accordance with the frequency offset successively input from the frequency offset estimation unit 152. The first phase rotation unit 130 corrects the digital received signal 200 in accordance with the value generated by the correction determination unit 154. FIG. 11G shows a state of operation of the residual phase estimation unit 156. In "header demodulation" and "data demodulation" of FIG. 11B, the residual phase estimation unit 156 estimates the residual phase error included in the signal output from the second phase rotation unit 132. As described before, CCK demodulation is performed in "data demodulation" of FIG. 11B. Therefore, the estimation of the residual phase error may be performed only in "data demodulation". It is ensured in this embodiment that the residual phase error is estimated in "header demodulation" for improvement in receiving performance. FIG. 11H shows a state of operation of the second phase rotation unit 132. The operation of the second phase rotation unit 132 corresponds to that of FIG. 11G.

Figure 12A:
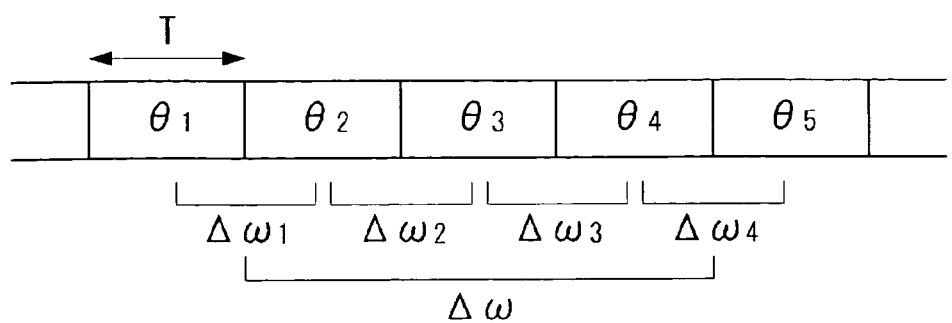
FIGS. 12A-12B show a sequence of operations related to initial phase estimation of FIG. 11.
Figure 12B:
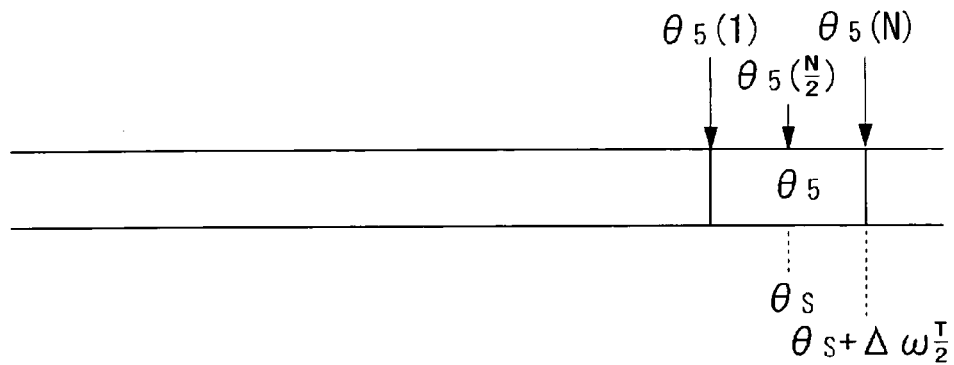

FIGS. 12A-12B show a sequence of operations related to the initial phase estimation of FIGS. 11A-11H. FIGS. 12A-12B show details of FIGS. 11D-11E. FIG. 12A shows an operation of the frequency offset estimation unit 152. Referring to FIG. 12A, θ1 through θ5 indicate phases of those symbols in SYNC corresponding to "frequency and phase estimation" of FIG. 11B. Since the symbol is spectrum spread, a signal indicated by θ1, for example, comprises a plurality of chip signals. The duration of one symbol is denoted by "T". The frequency offset estimation unit 152 estimates the frequency offset "Δω1" from the symbol corresponding to θ1 and the symbol corresponding to θ2. More specifically, a frequency offset between a chip signal included in the symbol corresponding to θ1 and a chip signal included in the symbol corresponding to θ2 is determined. The frequency offsets thus determined are averaged over an interval for the symbol so as to obtain Δω1. By averaging Δω1 through Δω4 obtained individually, Δω is obtained.

FIG. 12B shows an operation of the initial phase estimation unit 150. The initial phase estimation unit 150 operates in a time period which is a portion of the time period in which the frequency offset is estimated, i.e. only in the time period for the last symbol corresponding to θ5 of FIG. 12A. As described before, the symbol corresponding to θ5 includes a plurality of chip signals. The phases of these chip signals are denoted by θ5(1) through θ5(N), where N indicates the number of chips included in a symbol. The initial phase estimation unit 150 obtains θS by averaging θ5(1) through θ5(N). θS corresponds to the initial phase at a point of time corresponding to θ5(N/2) intermediate in a period of time for averaging.

The correction determination unit 154 corrects the initial phase θS obtained by the initial phase estimation unit 150. As illustrated, the following calculation is performed in order to obtain the initial phase θS' at a point of time when the period of time for θ5 is completed.

$$\theta S' = \theta S + \Delta\omega * T/2 \qquad \text{(equation 5)}$$

When the initial phase is obtained by the correction determination unit 154 at a point of time other than when the period of time for θ5 is completed, T/2 in equation 5 is modified accordingly. For example, when the initial phase is obtained after an elapse of time for one symbol since the time period for θ5 is completed, 3T/2 is used instead of T/2.

A description will now be given of the operation of the base band processing unit 26 with the construction as described above. The frequency offset estimation unit 152 estimates the frequency offset in a time period for SYNC in the burst signal. The initial phase estimation unit 150 estimates the initial phase in a portion of the time period for SYNC in the burst signal in which period the frequency offset estimation unit 152 operates. The correction determination unit 154 corrects the initial phase in accordance with the frequency offset, when the estimation by the initial phase estimation unit 150 is completed. The first phase rotation unit 130 detects the digital received signal 200 in accordance with the corrected initial phase. The frequency offset estimation unit 152 continues to estimate the frequency offset even after the initial phase estimation unit 150 completes the estimation. The correction determination unit 154 outputs the phase reflecting the frequency offset that continues to be estimated by the frequency offset estimation unit 152 to the first phase rotation unit 130. The signal detected by the first phase rotation unit 130 is equalized by the equalizer 42. The second phase rotation unit 132 and the residual phase estimation unit 156 estimates the residual frequency and perform necessary correction.

According to the third embodiment of the present invention, the estimation of frequency offset and the estimation of initial phase are performed in parallel so that the result of estimation of the initial phase is available earlier than other embodiments. Since the residual phase error that remains in the signal having the initial phase corrected is estimated, the phase error that occurs when the estimation of the residual phase error is started is reduced. Accordingly, the estimation of the residual phase error is converged rapidly. Since the residual phase error that remains in the equalized signal is estimated, adverse effects from multipath transmission is eliminated so that the estimation of the residual phase error is performed with a high precision. Since the initial phase estimation unit 150 comprises a register holding an initial phase and an adder, the circuit scale is prevented from becoming large.

The present invention has been described based on the embodiments which are only exemplary. It is understood by those skilled in the art that there exist other various modifications to the combination of each component and processing step described above and that such modifications are encompassed by the scope of the present invention.

In the first and third embodiments of the present invention, the approximation unit 112 determines the approximated value R of the magnitude of the Walsh transform value FWT by a sum of absolute values. Alternatively, the approximated value R of the Walsh transform value FWT may be determined as given below.

$$R = \text{Max}\{|I|, |Q|\} + 0.5 \times \text{Min}\{|I|, |Q|\} \qquad \text{(equation 6)}$$

Alternatively, the approximated value may be determined as follows.

$$R = \text{Max}\{|I|,|Q|\} + 0.5 \times \text{Min}\{|I|, |Q|\} - K \times (\text{Max}\{|I|, |Q|\} - \text{Min}\{|I|, |Q|\})$$

The coefficient is determined by calculation such that the smaller an error between the phase of the Walsh transform value FWT and the phase at which the Walsh code is assigned, the larger the coefficient. The approximated value R may be determined by multiplying the coefficient by a square sum of I and Q of the Walsh transform value FWT.

According to this variation, the receiving performance is improved. This is achieved by ensuring that the closer the phase of the Walsh transform value FWT to the phase at which the Walsh code is assigned, the larger the approximated value R.

In the first and second embodiments, the receiver 10 corrects only the phase error of the received signal. Alternatively, the frequency error may be corrected in addition to the phase error. According to this variation, the field for detection of phase error is narrowed and the precision in detection of the phase error is improved so that the receiving performance is improved. The requirement is that the phase error of the received signal is corrected.

In the third embodiment of the present invention, the correction determination unit 154 outputs the corrected initial phase after an elapse of a predetermined period of time since the completion of the estimation of the initial phase by the initial phase estimation unit 150. Alternatively, the correction determination unit 154 may output the corrected initial phase immediately after the completion of the estimation of the initial phase by the initial phase estimation unit 150. According to this variation, the known signal required for estimation of the initial phase is reduced in size and the efficiency of use of the burst signal is improved. The timing for the start of correction of the initial phase may be determined according to the burst format of the system to which the base band processing unit 26 is applied.

Combinations of the first through third embodiments may be valid embodiments of practicing the present invention. According to this variation, the combined advantageous effects are provided.

Although the present invention has been described by way of exemplary embodiments, it should be understood that many changes and substitutions may further be made by those skilled in the art without departing from the scope of the present invention which is defined by the appended claims.

What is claimed is:

1. A receiver comprising:
   a receiving unit receiving a signal in which a Walsh code including a plurality of chips respectively generated from a plurality of phase indicating signals represents a symbol;

a phase correction unit correcting a phase of the received signal to approach a selected one of phases at which the Walsh codes including the plurality of chips are assigned;

a Walsh transform unit subjecting the corrected signal to Walsh transform in units of symbols so as to generate a plurality of correlations having phase components;

an approximation unit computing approximated values indicating a magnitude of the plurality of correlations generated such that the closer to the phase at which the Walsh code is assigned, the larger the approximated value; and a selection unit selecting a single correlation by referring to the approximated values indicating the magnitude of the plurality of correlations and outputting a plurality of phase indicating signals corresponding to the selected correlation.

2. The receiver according to claim 1, wherein the Walsh codes included in the signal received by said receiving unit are assigned to phases at which absolute values of an in-phase component and that of a quadrature-phase component of the Walsh code are equal to each other, and wherein said approximation unit computes the approximated value indicating the magnitude of the plurality of correlations generated so that, the closer the absolute value of an in-phase component of the correlation to that of a quadrature-phase component, the larger the approximated value.

3. The receiver according to claim 1, wherein said phase correction unit detects a phase error between a selected one of the phases at which the Walsh codes including a plurality of chips are assigned and a phase of the selected correlation selected by said selection unit, and corrects the phase of the received signal so that the phase error becomes small.

4. The receiver according to claim 1, wherein said phase correction unit detects an error between the phase of the received signal and a selected one of phases at which the Walsh codes including a plurality of chips are assigned, and corrects the phase of the received signal so that the error becomes small.

5. The receiver according to claim 1, wherein said phase correction unit comprises:

a frequency offset estimation unit estimating a frequency offset included in the received signal;

an error estimation unit estimating a phase error of the received signal with respect to a selected one of the phases at which the Walsh codes including a plurality of chips are assigned, by statistically processing the received signal over a predetermined period of time;

an error correction unit determining a phase rotation from the estimated frequency offset, in accordance with the predetermined period of time for the statistical process, and corrects the estimated phase error by the phase rotation thus determined; and a correction execution unit correcting the phase of the received signal in accordance with the phase error thus corrected.

6. The receiver according to claim 5, wherein said error estimation unit averages the received signal over a predetermined period of time in the statistical process, and wherein said error correction unit determines the phase rotation from the estimated frequency offset, in accordance with a period of time calculated as a sum of a duration between the completion of the predetermined period of time in said error estimation unit and the start of correction by said correction execution unit, and half of the predetermined period of time in said error estimation unit.

7. The receiver according to claim 5, wherein said correction execution unit comprises:

a detection unit for detecting the received signal using the corrected phase error;

an equalizing unit subjecting the detected signal to an equalization process;

a residual error estimation unit estimating a residual phase error included in the signal subjected to the equalization process; and a residual error correction unit correcting the phase of the signal subjected to the equalization process in accordance with the residual phase error thus estimated.

8. The receiver according to claim 1, wherein said approximation unit computes the approximated values indicating the magnitude of the plurality of correlations generated such that absolute values of an in-phase component and a quadrature-phase component are added.

9. The receiver according to claim 1, wherein said approximation unit computes the approximated values indicating the magnitude of the plurality of correlations generated, by multiplying by 0.5 the smaller of the absolute values of the in-phase component and the quadrature-phase component of the correlations, and by adding thereto the larger of the absolute values of the in-phase component and the quadrature-phase component of the correlations.

10. The receiver according to claim 1, wherein said approximation unit computes the approximated values indicating the magnitude of the plurality of correlations generated, by multiplying by 0.5 the smaller of the absolute values of the in-phase component and the quadrature-phase component of the correlations, adding thereto the larger of the absolute values of the in-phase component and the quadrature-phase component of the correlations, and subtracting therefrom a value obtained by multiplying, by a predetermined coefficient, a difference between the larger of the absolute values and the smaller of the absolute values.

11. The receiver according to claim 1, wherein said approximation unit computes the approximated values indicating the magnitude of the plurality of correlations generated, by determining a predetermined coefficient in accordance with an error between a selected one of phases at which the Walsh codes including the plurality of chips are assigned and the phase of the corrections, and weighting the correlations by the coefficient.

12. The receiver according to claim 1, wherein said selection unit selects a single correlation by successively tournament comparing two approximated values indicating the magnitude of the plurality of correlations generated.

13. A receiver comprising:

a receiving unit receiving a signal;

a frequency offset estimation unit estimating a frequency offset included in the received signal;

a phase estimation unit estimating an initial phase by statistically processing the received signal over a predetermined period of time;

an initial phase correction unit determining a phase rotation from the estimated frequency offset, in accordance with the predetermined period of time for the statistical process, and correcting the estimated initial phase by the phase rotation thus determined; and a demodulation unit demodulating the received signal in accordance with the corrected initial phase; wherein said phase estimation unit averages the received signal over a predetermined period of time in the statistical process, and said initial phase correction unit determines the phase rotation from the estimated frequency offset, in accordance with a period of time calculated as a sum of a duration between the completion of the predetermined period of time in said phase estimation unit and the start of demodulation by said demodulation unit, and half of the predetermined period of time in said phase estimation unit.

14. A receiver comprising:
a receiving unit receiving a signal:
a frequency offset estimation unit estimating a frequency offset included in the received signal;
a phase estimation unit estimating an initial phase by statistically processing the received signal over a predetermined period of time;
an initial phase correction unit determining a phase rotation from the estimated frequency offset, in accordance with the predetermined period of time for the statistical process, and correcting the estimated initial phase by the phase rotation thus determined; and
a demodulation unit demodulating the received signal in accordance with the corrected initial phase; wherein
said demodulation unit comprises:
a detection unit for detecting the received signal using the corrected initial phase;
an equalizing unit subjecting the detected signal to an equalization process;
a residual error estimation unit estimating a residual phase error included in the signal subjected to the equalization process; and
a residual error correction unit correcting the phase of the signal subjected to the equalization process in accordance with the residual phase error thus estimated.

15. A receiving method comprising the steps of: receiving a signal in which a Walsh code including a plurality of chips respectively generated from a plurality of phase indicating signals represents a symbol;
correcting a phase of the received signal to approach a selected one of phases at which the Walsh codes including the plurality of chips are assigned;
subjecting the corrected signal to Walsh transform in units of symbols so as to generate a plurality of correlations having phase components;
computing approximated values indicating a magnitude of the plurality of correlations generated such that the closer to the phase at which the Walsh code is assigned, the larger the approximated value; and
selecting a single correlation by referring to the approximated values indicating the magnitude of the plurality of correlations and outputting a plurality of phase indicating signals corresponding to the selected correlation.

16. The receiving method according to claim 15, wherein the Walsh codes included in the signal received by the step of receiving are assigned to phases at which absolute values of an in-phase component and that of a quadrature-phase component of the Walsh code are equal to each other, and wherein the step of computing the approximated values computes the approximated value indicating the magnitude of the plurality of correlations generated so that, the closer the absolute value of an in-phase component of the correlation to that of a quadrature-phase component, the larger the approximated value.

17. The receiving method according to claim 15, wherein the step of correcting the phase detects a phase error between a selected one of the phases at which the Walsh codes including a plurality of chips are assigned and a phase of the selected correlation, and corrects the phase of the received signal so that the phase error becomes small.

18. The receiving method according to claim 15, wherein the step of correcting the phase detects an error between the phase of the received signal and a selected one of phases at which the Walsh codes including a plurality of chips are assigned, and corrects the phase of the received signal so that the error becomes small.

19. The receiving method according to claim 15, wherein the step of correcting the phase comprises the steps of:
estimating a frequency offset included in the received signal;
estimating a phase error of the received signal with respect to a selected one of the phases at which the Walsh codes including a plurality of chips are assigned, by statistically processing the received signal over a predetermined period of time;
determining a phase rotation from the estimated frequency offset, in accordance with the predetermined period of time for the statistical process, and correcting the estimated phase error by the phase rotation thus determined; and
correcting the phase of the received signal in accordance with the phase error thus corrected.

20. The receiving method according to claim 19, wherein the step of estimating the phase error averages the received signal over a predetermined period of time in the statistical process, and wherein
the step of correcting the estimated phase error determines the phase rotation from the estimated frequency offset, in accordance with a period of time calculated as a sum of a duration between the completion of the predetermined period of time in the step of estimating the phase error and the start of correction in the step of correcting the phase of the received signal, and half of the predetermined period of time in the step of estimating the phase error.

21. The receiving method according to claim 19, wherein the step of correcting the phase of the received signal comprises the steps of:
detecting the received signal using the corrected phase error;
subjecting the detected signal to an equalization process;
estimating a residual phase error included in the signal subjected to the equalization process;
correcting the phase of the signal subjected to the equalization process in accordance with the residual phase error thus estimated.

22. The receiving method according to claim 15, wherein the step of computing the approximated values computes the approximated values indicating the magnitude of the plurality of correlations generated such that absolute values of an in-phase component and a quadrature-phase component are added.

23. The receiving method according to claim 15, wherein the step of computing the approximated values computes the approximated values indicating the magnitude of the plurality of correlations generated, by multiplying by 0.5 the smaller of the absolute values of the in-phase component and the quadrature-phase component of the correlations, and by adding thereto the larger of the absolute values of the in-phase component and the quadrature-phase component of the correlations.

24. The receiving method according to claim 15, wherein the step of computing the approximated values computes the approximated values indicating the magnitude of the plurality of correlations generated, by multiplying by 0.5 the smaller of the absolute values of the in-phase component and the quadrature-phase component of the correlations, adding thereto the larger of the absolute values of the in-phase component and the quadrature-phase component of the correlations, and subtracting therefrom a value obtained by multiplying, by a predetermined coefficient, a difference between the larger of the absolute values and the smaller of the absolute values.

25. The receiving method according to claim 15, wherein the step of computing the approximated values computes the approximated values indicating the magnitude of the plurality of correlations generated, by determining a predetermined coefficient in accordance with an error between a selected one of phases at which the Walsh codes including the plurality of chips are assigned and the phase of the corrections, and weighting the correlations by the coefficient.

26. The receiving method according to claim 15, wherein the step of outputting the plurality of phase indicating signals selects a single correlation by successively tournament comparing two approximated values indicating the magnitude of the plurality of correlations generated.

27. A receiving method comprising the steps of:

receiving a signal;

estimating a frequency offset included in the received signal;

estimating an initial phase by statistically processing the received signal over a predetermined period of time;

determining a phase rotation from the estimated frequency offset, in accordance with the predetermined period of time for the statistical process, and correcting the estimated initial phase by the phase rotation thus determined; and demodulating the received signal in accordance with the corrected initial phase; wherein the step of estimating the initial phase averages the received signal over a predetermined period of time in the statistical process, and the step of correcting the initial phase determines the phase rotation from the estimated frequency offset, in accordance with a period of time calculated as a sum of a duration between the completion of the predetermined period of time in the step of estimating the initial phase and the start of demodulation in the step of demodulation, and half of the predetermined period of time in the step of estimating the initial phase.

28. A receiving method comprising the steps of:

receiving a signal;

estimating a frequency offset included in the received signal;

estimating an initial phase by statistically processing the received signal over a predetermined period of time;

determining a phase rotation from the estimated frequency offset, in accordance with the predetermined period of time for the statistical process, and correcting the estimated initial phase by the phase rotation thus determined; and demodulating the received signal in accordance with the corrected initial phase wherein the step of demodulation comprises the steps of:

detecting the received signal using the corrected initial phase;

subjecting the detected signal to an equalization process;

estimating a residual phase error included in the signal subjected to the equalization process; and correcting the phase of the signal subjected to the equalization process in accordance with the residual phase error thus estimated.

* * * * *